United States Patent
Narita et al.

(10) Patent No.: US 11,718,967 B2
(45) Date of Patent: Aug. 8, 2023

(54) GUIDANCE VEHICLE

(71) Applicant: TOYOTA JIDOSHA KABUSHIKI KAISHA, Toyota (JP)

(72) Inventors: Saki Narita, Toyota (JP); Tetsuya Kanata, Susono (JP); Yozo Iwami, Susono (JP); Daisaku Honda, Nagoya (JP); Yuhei Katsumata, Fuji (JP); Hideki Fukudome, Toyota (JP); Takuya Watabe, Hachioji (JP); Naoko Ichikawa, Tokyo-to (JP); Yuta Maniwa, Susono (JP); Yuki Nishikawa, Susono (JP); Daisuke Ishii, Shizuoka-ken (JP); Daisuke Sato, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 132 days.

(21) Appl. No.: 17/476,792

(22) Filed: Sep. 16, 2021

(65) Prior Publication Data

US 2022/0104457 A1    Apr. 7, 2022

(30) Foreign Application Priority Data

Oct. 2, 2020   (JP) .................................. 2020-168057

(51) Int. Cl.
*E01H 1/12*  (2006.01)
*E01H 1/08*  (2006.01)
(Continued)

(52) U.S. Cl.
CPC .......... *E01H 1/006* (2013.01); *A01K 15/021* (2013.01); *A01K 27/004* (2013.01);
(Continued)

(58) Field of Classification Search
CPC ..... A01K 15/021; A01K 29/00; A01K 29/005
See application file for complete search history.

(56) References Cited

U.S. PATENT DOCUMENTS

2019/0141955 A1* 5/2019 Dharmesh ............... E01H 1/006
                                                          119/703

FOREIGN PATENT DOCUMENTS

JP     H10171533   *  6/1998  ............. G05D 1/028
JP     2008-282073 A  11/2008
(Continued)

*Primary Examiner* — Magdalena Topolski
*Assistant Examiner* — Spencer T Callaway
(74) *Attorney, Agent, or Firm* — Dinsmore & Shohl LLP

(57) ABSTRACT

A guidance vehicle guides a dog for a walk, and includes a leash attachment, a distance sensor, and an electronic control unit. The leash attachment is configured to attach a leash that connects the dog. The distance sensor is configured to detect a dog-to-vehicle distance being a distance between the dog and the guidance vehicle. The electronic control unit is configured to execute a travel control of the guidance vehicle. The electronic control unit includes, as one of modes of the travel control, a walk guidance mode that causes the guidance vehicle to automatically travel along a walk route while guiding the dog to walk. The walk guidance mode executed by the electronic control unit includes a basic walk mode that controls the dog-to-vehicle distance so as to maintain a constant distance when the dog is moving along the walk route.

2 Claims, 17 Drawing Sheets

(51) Int. Cl.
*E01H 3/02* (2006.01)
*G05D 1/03* (2006.01)
*E01H 1/00* (2006.01)
*A01K 29/00* (2006.01)
*A01K 27/00* (2006.01)
*B25J 9/00* (2006.01)
*B25J 9/16* (2006.01)
*G05D 1/02* (2020.01)
*A01K 15/02* (2006.01)

(52) U.S. Cl.
CPC .......... *A01K 29/005* (2013.01); *B25J 9/0003* (2013.01); *B25J 9/0009* (2013.01); *B25J 9/163* (2013.01); *G05D 1/0223* (2013.01)

(56) References Cited

FOREIGN PATENT DOCUMENTS

JP 2017-006051 A 1/2017
WO WO-2016065625 A1 * 5/2016 ........... A01K 15/021

* cited by examiner

GUIDANCE VEHICLE

CROSS-REFERENCE TO RELATED APPLICATION

The present disclosure claims priority under 35 U.S.C. § 119 to Japanese Patent Application No. 2020-168057, filed on Oct. 2, 2020, which is incorporated herein by reference in its entirety.

BACKGROUND

Technical Field

The present disclosure relates to a guidance vehicle, and more particularly to a guidance vehicle configured to guide a dog for a walk using an automatic traveling function.

Background Art

JP 2017-006051 A discloses a small automatic unmanned aerial vehicle (drone) that assists a dog in walking. This automatic unmanned aerial vehicle can guide and walk a dog by moving the dog while the dog is connected to a leash.

SUMMARY

When walking a dog, the dog does not always walk obediently at a constant speed along a fixed walk route. Therefore, in order to smoothly guide a dog for a walk using a moving body that can automatically travel, it is favorable to be able to appropriately control the distance between the dog and the moving body. However, the method of using the automatic unmanned aerial vehicle that floats around a dog for walking a dog as disclosed in JP 2017-006051 A has room for improvement in that the distance between the dog and the moving body is appropriately controlled.

The present disclosure has been made in view of the problem described above, and an object of the present disclosure is to provide a guidance vehicle which can smoothly guide a dog for a walk.

A guidance vehicle according to the present disclosure that guides a dog for a walk includes: a leash attachment configured to attach a leash that connects the dog; a distance sensor configured to detect a dog-to-vehicle distance being a distance between the dog and the guidance vehicle; and an electronic control unit configured to execute a travel control of the guidance vehicle. The electronic control unit includes, as one of modes of the travel control, a walk guidance mode that causes the guidance vehicle to automatically travel along a walk route while guiding the dog to walk. The walk guidance mode executed by the electronic control unit includes a basic walk mode that controls the dog-to-vehicle distance so as to maintain a constant distance when the dog is moving along the walk route.

In the basic walk mode, the electronic control unit may be configured to control a speed of the guidance vehicle so as to maintain the constant distance when the dog is moving along the walk route.

The leash attachment may be configured for the leash to be retractable and include an actuator configured to perform at least one of winding and locking of the leash. In the basic walk mode, the electronic control unit may be configured to control the leash attachment to perform the winding or the locking of the leash so as to maintain the constant distance when the dog is moving along the walk route.

The leash attachment may be configured for the leash to be retractable and include an actuator configured to perform at least one of winding and locking of the leash. In the basic walk mode, the electronic control unit may be configured to control the leash attachment to perform the winding or the locking of the leash so as to maintain the constant distance when the dog is moving in a direction away from the walk route.

The guidance vehicle may further include: a top plate having a riding surface configured for the dog to ride on; and a dog paw position sensor including one or more dog paw position detectors associated with one or more traveling directions of the guidance vehicle, and attached to a dog riding section of the riding surface. The electronic control unit may include a dog operation mode that controls travel of the guidance vehicle based on an input to the dog paw position sensor as one of the modes of the travel control.

The riding surface may be configured for an owner of the dog to ride on. The guidance vehicle may further include an operation device configured for the owner to operate the guidance vehicle. When an input to the dog paw position sensor and an input to the operation device are simultaneously present during execution of the dog operation mode, the electronic control unit may be configured to control the travel of the guidance vehicle based on the input to the operation device.

The leash attachment may be configured for the leash to be retractable and include an actuator configured to perform winding of the leash. The guidance vehicle may further include a leash state sensor configured to detect at least one of a feed speed of the leash, a feed acceleration of the leash, and a load acting on the leash. The electronic control unit may be configured to control the leash attachment to perform the winding of the leash when at least one of the feed speed, the feed acceleration, and the load exceeds a corresponding threshold value during execution of the basic walk mode.

The leash attachment may be configured for the leash to be retractable and include an actuator configured to perform locking of the leash. The guidance vehicle may further include a leash state sensor configured to detect at least one of a feed speed of the leash, and a feed acceleration of the leash. The electronic control unit may be configured to control the leash attachment to perform the locking of the leash when at least one of the feed speed, and the feed acceleration exceeds a corresponding threshold value during execution of the basic walk mode.

The leash attachment may be configured for the leash to be retractable and include an actuator configured to perform at least one of winding and locking of the leash. The guidance vehicle may further include a distance sensor configured to detect a distance between a person or animal around the guidance vehicle and the dog. The electronic control unit may be configured to control the leash attachment to perform the winding or the locking of the leash when the distance between the person or animal and the dog becomes shorter than a threshold value during execution of the basic walk mode.

The guidance vehicle may further include: a leash state sensor configured to detect at least one of a feed speed of the leash, a feed acceleration of the leash, and a load acting on the leash; and a camera configured to photograph the dog. The walk guidance mode may include a discipline mode that disciplines the dog. In the discipline mode, the electronic control unit may be configured to: perform deceleration or stop of the guidance vehicle when at least one of the feed speed, the feed acceleration, and the load exceeds a corresponding threshold value; and resume travel of the guidance vehicle after the dog slows down or stops in response to the deceleration or stop of the guidance vehicle and turns its face toward the guidance vehicle.

The guidance vehicle may further include a behavior sensor configured to detect a behavior of the dog. The electronic control unit may be configured to execute: a learning process to learn a pre-excretion behavior of the dog based on behavior information of the dog acquired using the behavior sensor during execution of the walk guidance mode; and a vehicle stop process to stop the guidance vehicle when the behavior of the dog detected by the behavior sensor matches the pre-excretion behavior learned by the learning process.

The guidance vehicle may further include: a water discharger including a tank for storing water and configured to discharge the water in the tank; and a camera configured to photograph the dog and a surrounding of the dog. The electronic control unit may be configured to execute a water discharge process to control the water discharger so as to sprinkle the water on urine when detecting that the dog has urinated, based on an image photographed by the camera during execution of the walk guidance mode.

The water discharger may include a water quantity sensor configured detect a quantity of the water in the tank. When the quantity of the water detected by the water quantity sensor is less than a threshold value at a start of automatic traveling of the guidance vehicle toward a meeting place with an owner of the dog to pick up the dog, the electronic control unit may be configured to execute a notification process to notify a mobile terminal of the owner that the quantity of water is small.

The guidance vehicle may further include: a collection device configured to collect poop of the dog; and a camera configured to photograph the dog and a surrounding of the dog. The electronic control unit may be configured to execute a collection process to control the collection device so as to collect the poop when detecting that the dog has pooped, based on an image photographed by the camera during execution of the walk guidance mode.

According to the guidance vehicle of the present disclosure, the basic walk mode is executed, and the dog-to-vehicle distance is thereby controlled so as to maintain the constant distance when the dog is moving along the walk route. As a result, since the distance between the dog and the guidance vehicle can be appropriately controlled, the walking of the dog can be smoothly guided.

DETAILED DESCRIPTION

Figure 1:
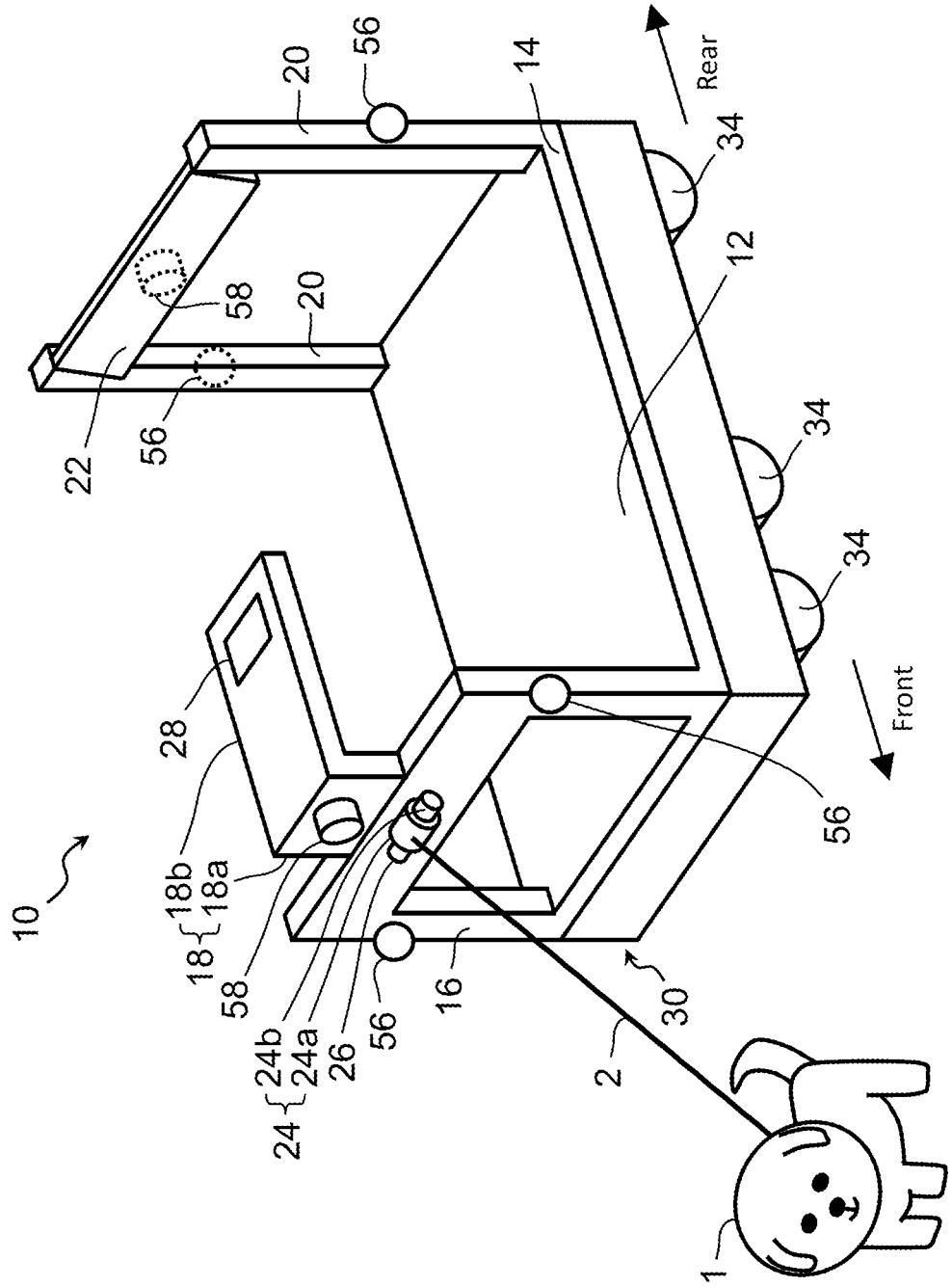
FIG. 1 is a perspective view of a guidance vehicle according to a first embodiment.

In the following embodiments of the present disclosure, the same components in the drawings are denoted by the same reference numerals, and redundant descriptions thereof are omitted or simplified. Moreover, it is to be understood that even when the number, quantity, amount, range or other numerical attribute of an element is mentioned in the following description of the embodiments, the present disclosure is not limited to the mentioned numerical attribute unless explicitly described otherwise, or unless the present disclosure is explicitly specified by the numerical attribute theoretically.

1. First Embodiment 1-1. Configuration Example of Guidance Vehicle

Figure 2:
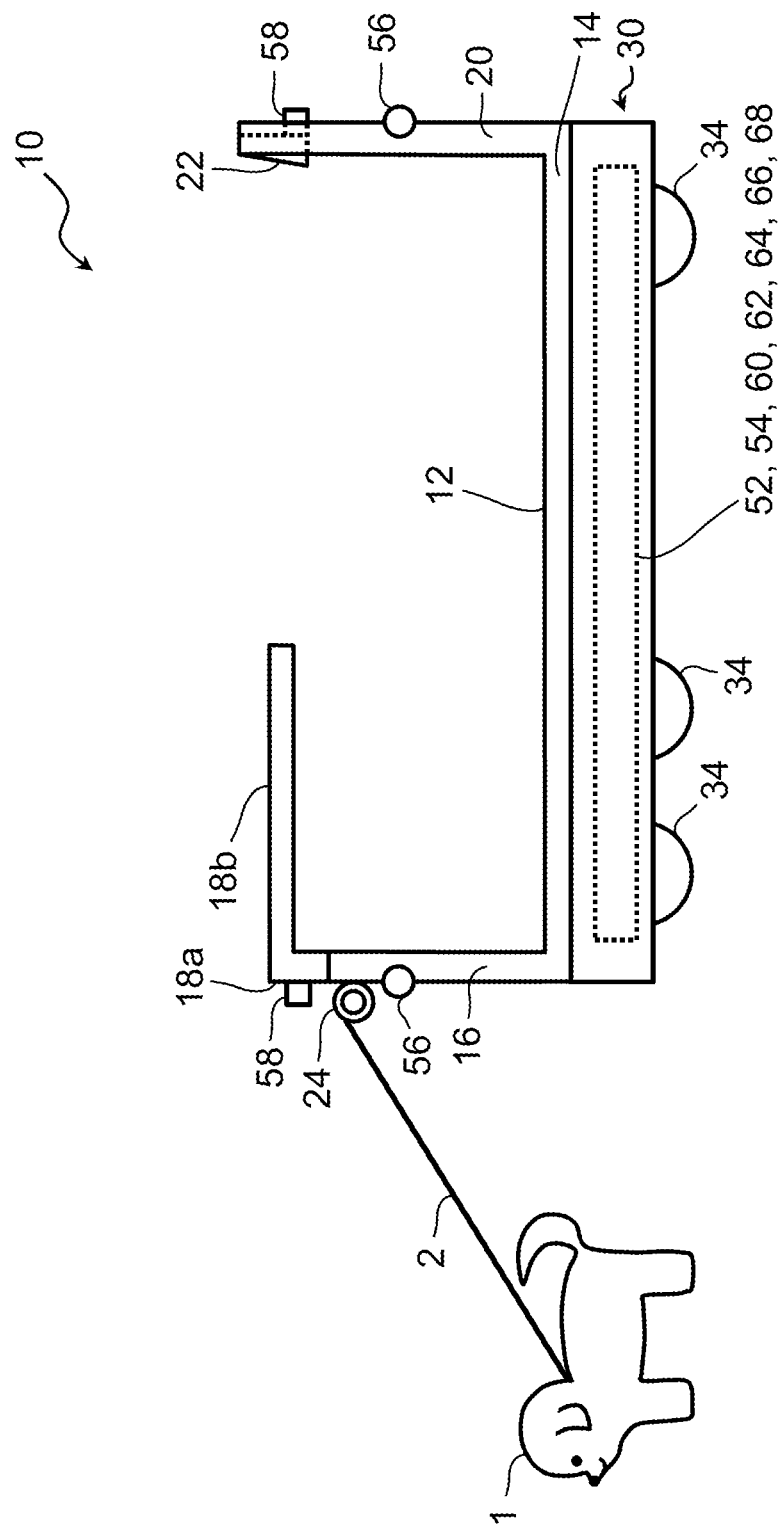
FIG. 2 is a side view of the guidance vehicle shown in FIG. 1.

FIG. 1 is a perspective view of a guidance vehicle 10 according to a first embodiment. FIG. 2 is a side view of the guidance vehicle 10 shown in FIG. 1.

The guidance vehicle 10 is a type of automatic traveling vehicle capable of unmanned driving as described below, and is a land traveling vehicle that can be used to guide a dog 1 for the walk without the need to be accompanied by an owner by using an automatic traveling function. The guidance vehicle 10 includes a top plate 14 having a riding surface (deck) 12 configured for the dog 1 and a user (i.e., the owner of the dog 1) to ride on. However, the "guidance vehicle" according to the present disclosure does not have to have a riding surface when the guidance vehicle provides only a service for guiding a dog to walk unattended without being accompanied by an owner. In addition, the guidance vehicle does not have to be a vehicle dedicated to automatic traveling as in a guidance vehicle 80 exemplified in a second embodiment, which will be described below, and may be configured to travel by the operation of at least one of a dog and a person.

In the guidance vehicle (hereinafter, simply referred to as a "vehicle") 10, the configuration of a riding space located on the riding surface 12 of the top plate 14 can be freely selected. FIGS. 1 and 2 show an example of the configuration. That is, a rectangular frame-shaped panel 16 upright from the riding surface 12 is provided at the front end portion of the vehicle 10. The panel 16 is integrally formed with a table 18 which is convenient for one or more users on board. Also, at the rear end portion of the vehicle 10, supports 20 are provided upright from each corner of the riding surface 12. Furthermore, a backrest 22 formed so as to connect the tips of the two supports 20 is provided at the rear end portion.

As shown in FIG. 1, a leash attachment (or leash mount) 24 is installed on an upper portion of the panel 16. A leash 2 for connecting the dog 1 to the vehicle 10 is attached to the leash attachment 24. As an example, the leash attachment 24 includes a main body 24a capable of winding the leash 2, and an actuator 24b for rotationally driving the main body 24a to wind the leash 2. The actuator 24b is, for example, an electric type.

According to the retractable leash attachment 24, the leash 2 can be expanded and contracted in accordance with the movement of the dog 1. More specifically, by making the main body 24a rotatable by not operating the actuator 24b, the leash 2 can be freely extended (delivered) to a predetermined length when the dog 1 pulls the leash 2. Furthermore, by driving the actuator 24b, the leash 2 (i.e., the feed (unwinding) of the leash 2) can be locked to fix the length of the leash 2 at any length, and the leash 2 can also be wound. Additionally, in the example using the leash attachment 24, it is assumed that the leash 2 is provided in the vehicle 10 together with the leash attachment 24.

Moreover, a leash state sensor 26 configured to detect the state of the leash 2 is attached to the leash attachment 24. The leash state sensor 26 includes a feed speed sensor, a feed acceleration sensor, and a load sensor.

Additionally, for example, the table 18 is located in the center of the vehicle 10 in the left-right direction, and includes a support portion 18a fixed to the panel 16 of the vehicle 10 and a top plate portion 18b extending horizontally from the support portion 18a toward the rear of the vehicle 10. As an example, an HMI (Human Machine Interface) device 28 such as a touch panel for transmitting information between the vehicle 10 and the user such as an owner who has boarded the vehicle 10 is installed on the top plate portion 18b of the table 18.

Furthermore, the vehicle 10 is provided with a chassis unit 30 relating to a traveling function together with the top plate 14. As an example, the top plate 14 is separate from the upper surface of the chassis unit 30, and is mounted on the chassis unit 30. Alternatively, the top plate 14 may form the upper surface of the chassis unit 30.

Figure 3:
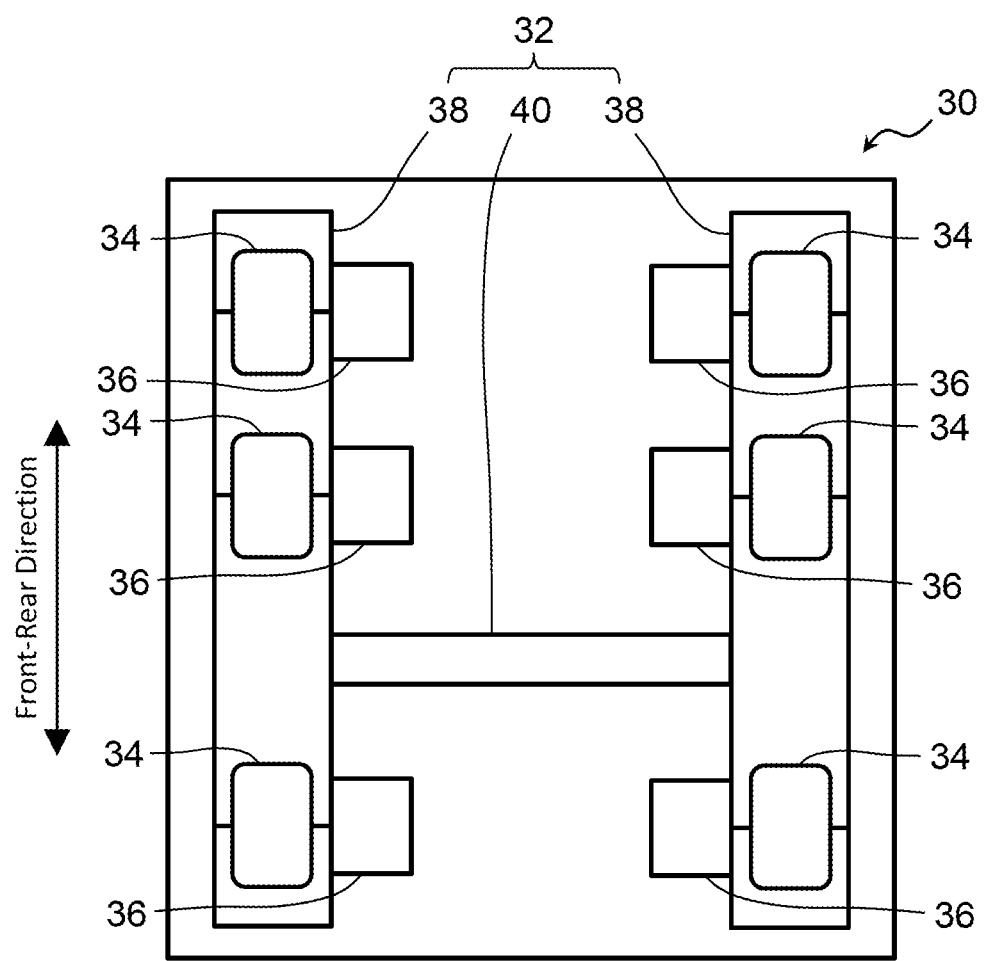
FIG. 3 is a diagram showing a configuration example of a chassis unit shown in FIG. 1.

FIG. 3 is referenced in addition to FIGS. 1 and 2. FIG. 3 is a diagram showing a configuration example of the chassis unit 30 shown in FIG. 1. The chassis unit 30 includes a frame 32, wheels 34, and electric motors 36. As an example, six wheels 34 are provided. More specifically, three wheels 34 are disposed on each of the left and right sides of the vehicle 10 in a bilaterally symmetrical manner. The electric motor 36 is provided, for example, coaxially with each of the six wheels 34. It should be noted that the number of the wheels 34 is arbitrarily determined in accordance with requirements such as the riding capacity of the vehicle 10 and the required driving force thereof. Instead of six, for example, a total of four wheels, i.e., two wheels on the left and two wheels on the right, may thus be used.

FIG. 3 shows a schematic shape of the frame 32. The frame 32 includes a main member 38 extending in the front-rear direction of the vehicle 10 on each of the left and right sides of the vehicle 10, and a sub-member 40 connecting the two main members 38. Three left wheels 34 and three electric motors 36 for driving them are fixed to the main member 38 on the left of the vehicle 10. Similarly, three right wheels 34 and three electric motors 36 for driving them are fixed to the main member 38 on the right of the vehicle 10.

Acceleration and deceleration of the vehicle 10 are performed by controlling the electric motors 36. Further, the vehicle 10 can be braked, for example, by using a regenerative brake realized by the control of the electric motors 36. The vehicle 10 may be provided with a mechanical brake on any wheel 34 for braking.

Moreover, according to the vehicle 10 including the above-described chassis unit 30, by providing a difference between the rotational speeds of the three wheels 34 on the left side and the rotational speeds of the three wheels 34 on the right side, the vehicle 10 can be turned to the left and right. In the example shown in FIG. 3, each wheel 34 is a wheel having a general structure in which a tire is incorporated. Instead of this kind of example, in order to increase the degree of freedom of turning of the vehicle 10, for example, the four wheels 34 positioned at both ends in the front-rear direction may be replaced by omnidirectional moving wheels (so-called omni wheels). Furthermore, instead of these examples, for example, a steering apparatus may be used to turn the vehicle 10.

Figure 4:
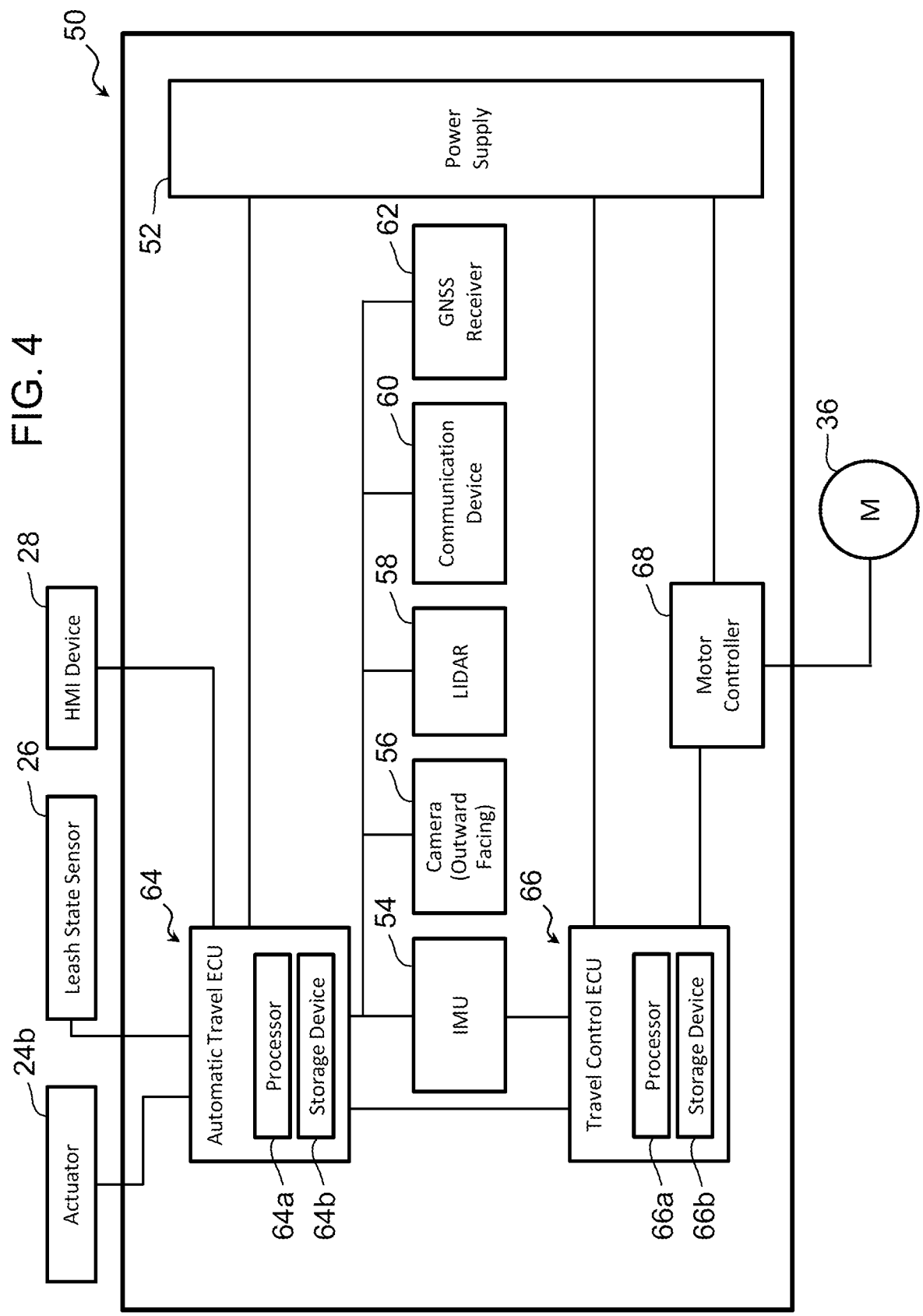
FIG. 4 is a block diagram schematically showing an example of configuration of a control system for controlling travel of the guidance vehicle shown in FIG. 1.

FIG. 4 is a block diagram schematically showing an example of the configuration of a control system 50 for controlling the travel of the guidance vehicle 10 shown in FIG. 1. The control system 50 is mounted on the guidance vehicle 10. The control system 50 is configured to cause the vehicle 10 to automatically travel.

As shown in FIG. 4, the control system 50 includes a power supply 52, an inertial measurement unit (IMU) 54, cameras 56, LIDARs (laser imaging detection and ranging) 58, a communication device 60, a global navigation satellite system (GNSS) receiver 62, an automatic travel electronic control unit (ECU) 64, a travel control ECU 66, and a motor controller 68. As shown in FIG. 1, there are four cameras 56 as an example, and they are installed at each of the left and right ends of the panel 16 and each of the two supports 20. There are two LIDARS 58 as an example, and they are installed on the front surface of the support portion 18a of the table 18 and the back surface of the backrest 22. As shown in FIG. 2, the components 52, 54, 60 to 68 of the control system 50 other than the cameras 56 and the LIDARs 58 are disposed between the frame 32 and the top plate 14.

The power supply 52 is typically a battery that is externally charged. The power supply 52 supplies electric power to each device (the electric motors 36 and the control system 50) mounted on the vehicle 10. The power supply 52 also supplies electric power to the actuator 24b and the HMI device 28 via an automatic travel ECU 64. The IMU 54 detects angular velocities and accelerations of three axes. Therefore, according to the IMU 54, it is possible to acquire various traveling states such as the speed (i.e., vehicle speed), the acceleration, and the posture of the vehicle 10. The IMU 54 transmits the acquired traveling states to the automatic travel ECU 64 and the travel control ECU 66.

The cameras 56 and the LIDARs 58 are examples of "external sensor" for recognizing the surrounding environment of the vehicle 10. The four cameras 56 photograph the surroundings of the vehicle 10 (more specifically, the front right, front left, rear right, and rear left of the vehicle 10). The two LIDARs 58 respectively detect objects in front of and behind the vehicle 10. According to the LIDAR 58, the distance and the direction of the detected object from the vehicle 10 can be acquired. The cameras 56 and the LIDARs 58 transmit the acquired information to the automatic travel ECU 64. Additionally, instead of the example shown in FIGS. 1 to 3, only one of the camera 56 and the LIDAR 58 may be used.

The communication device 60 performs communication (transmission and reception) with a communication device 72*c* of a management server 72 (see FIG. 5), which will be described later, via a wireless communication network such as 4G or 5G. Also, the communication device 60 communicates with a mobile terminal 3 (see FIG. 5), which will be described later, via a similar wireless communication network. The GNSS receiver 62 acquires the position and orientation of the vehicle 10 based on signals from GNSS satellites. The GNSS receiver 62 transmits the acquired information to the automatic travel ECU 64.

The automatic travel ECU 64 includes a processor 64*a* and a storage device 64*b*. The storage device 64*b* stores at least one program configured to cause the vehicle 10 to automatically travel. When the processor 64*a* reads and executes a program stored in the storage device 64*b*, various kinds of processing performed by the processor 64*a* are realized. Also, the storage device 64*b* stores map information as a map database. Alternatively, the processor 64*a* may acquire the map information from a map database stored in a storage device 72*b* (see FIG. 5) of the management server 72.

Modes of travel control of the vehicle 10 include a basic automatic travel mode and a walk guidance mode. The basic automatic travel mode is executed to cause the vehicle 10 to automatically travel toward the destination in an unmanned state. For example, the basic automatic travel mode is executed at the time of vehicle dispatch or at the time of returning to a vehicle storage based on a command from the management server 72. The walk guidance mode is executed to cause the vehicle 10 to automatically travel along a walk route while guiding a dog for a walk.

The destination used in the basic automatic travel mode is typically determined in the management server 72 and transmitted to the automatic travel ECU 64 via the management server 72. The automatic travel ECU 64 (processor 64*a*) sets a target travel route from the current position of the vehicle 10 to the destination and a target vehicle speed on the basis of the position information of the vehicle 10 from the GNSS receiver 62 and the map information of the map database.

On the other hand, the target travel route used in the walk guidance mode, in other words, the walk route, is, for example, a route whose starting point is the place where the dog 1 is entrusted to the vehicle 10 and whose destination is the starting point. This kind of walk route is determined, for example, as follows. That is, in an example of using a vehicle dispatch service described below, when the owner of the dog 1 operates the mobile terminal 3 to reserve the vehicle 10 on a vehicle dispatch application, the walk route requested by the owner may be selected from among proposed walk route candidates. Alternatively, the walk route may be set by the automatic travel ECU 64 that uses a function of randomly generating a travel route. Moreover, the learning result of the past walk routes of the dog 1 to be walked may be reflected in the determination of the walk route by the automatic travel ECU 64. The target vehicle speed in the walk guidance mode is set (controlled) by the automatic travel ECU 64.

In addition, the processor 64*a* changes (updates) the set target travel route and the set target vehicle speed as necessary on the basis of the traveling state information and the position information of the vehicle 10 based on the IMU 54 and the GNSS receiver 62, and the information of the objects around the vehicle 10 acquired by the cameras 56 and the LIDARs 58.

The automatic travel ECU 64 transmits the latest target travel route and the target vehicle speed to the travel control ECU 66. The travel control ECU 66 includes a processor 66*a* and a storage device 66*b*. The storage device 66*b* stores various kinds of information necessary for the control of each electric motor 36 to cause the vehicle 10 to automatically travel. The processor 66*a* generates a control command value (more specifically, a command value such as a rotational speed and a rotation direction) of each electric motor 36 for causing the vehicle 10 to travel so as to achieve the target travel route and the target vehicle speed. The processor 66*a* uses the information indicating the traveling state acquired by the IMU 54 to generate the control command value.

The travel control ECU 66 commands the generated control command value of each electric motor 36 to each motor controller 68. The motor controller 68 includes a drive circuit configured to control electric power supplied to the electric motors 36 from the power supply 52, and is provided for each of the six electric motors 36. Each motor controller 68 controls energization to each electric motor 36 according to the control command value from the travel control ECU 66.

According to the control by the automatic travel ECU 64 and the travel control ECU 66 described above, the vehicle 10 can automatically travel toward the destination.

1-2. Configuration Example of Operation Management System for Guidance Vehicle

Figure 5:
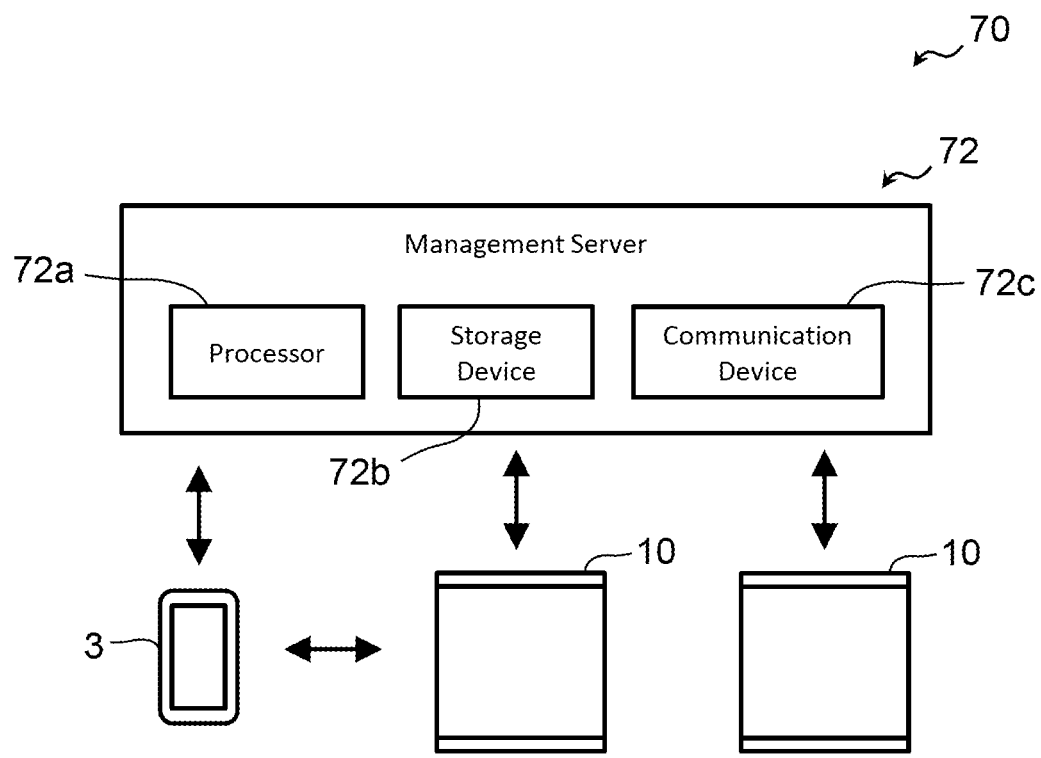
FIG. 5 is a block diagram schematically showing a configuration of an operation management system according to the first embodiment.

FIG. 5 is a block diagram schematically showing a configuration of the operation management system 70 according to the first embodiment. The guidance vehicle 10 configured as described above can be used for various purposes for the movement of people, animals or objects. One of the uses of this kind of vehicle 10 is a walk agency service in which an unmanned vehicle 10 walks a dog on behalf of the owner. More specifically, the vehicle 10 executes the walk guidance mode on a road designed to coexist with pedestrians to perform automatic traveling, thereby guiding the dog to walk. The travel control according to the first embodiment, which will be described below, is directed to the vehicle 10 that provides this kind of walk agency service. The operation management system 70 is configured to manage the operation of a plurality of vehicles 10 capable of providing the walk agency service.

Specifically, when the walk agency service as described above is provided with a vehicle dispatching service that dispatches the vehicle 10 in response to a request from the owner (i.e., a service in which the vehicle 10 visits the owner to pick up the dog 1), it becomes more convenient. In order to realize a walk agency service involving vehicle dispatch, the operation management system 70 includes a plurality of vehicles 10, a mobile terminal 3, and a management server 72. The mobile terminal 3 is carried by the user of the vehicle 10 (i.e., the owner of the dog) and is, for example, a smartphone or a tablet personal computer. The mobile terminal 3 includes a processor, a storage device, and a communication device.

The management server 72 includes a processor 72a, a storage device 72b, and a communication device 72c. The storage device 72b stores at least one program for the walk agency service including vehicle dispatch. The processor 72a reads and executes a program stored in the storage device 72b. Accordingly, various functions for providing the walk agency service including vehicle dispatch are realized. For example, the management server 72 (communication device 72c) communicates with the communication device 60 of each vehicle 10 and the mobile terminal 3 via a wireless communication network. The management server 72 manages user information. Further, the management server 72 performs operation management of the plurality of vehicles 10 including the vehicle dispatch service. The operation management of the plurality of vehicles 10 by the management server 72 may include, for example, a remote operation of the vehicle 10 in an emergency by an operator via the management server 72.

The walk agency service accompanied by vehicle dispatch is provided, for example, as follows. First, the vehicle 10 automatically travels so as to arrive at the owner of the dog 1 at the meeting time (i.e., scheduled vehicle dispatch time) determined at the time of reservation for vehicle dispatch, for example (basic automatic travel mode).

When the vehicle 10 arrives, the owner connects the dog 1 to the leash 2 (i.e., entrusts the dog 1 to the vehicle 10. Then, the owner operates the mobile terminal 3 or the HMI device 28 on the vehicle 10 to notify the vehicle 10 that the walk preparation is completed, and the owner selects a requested walk guidance mode (in this embodiment, a basic walk mode described below). As a result, the execution condition of the walk guidance mode is satisfied, and the walking of the dog 1 accompanied by the guidance by the vehicle 10 (that is, the walk guidance mode) is started. The requested walk guidance mode may be selected by operating the mobile terminal 3 at the time of reservation for vehicle dispatch.

In the walk guidance mode, the automatic travel ECU 64 causes the vehicle 10 to automatically travel along a predetermined walk route while guiding the dog 1 to walk. When the vehicle 10 returns to the owner together with the dog 1 after completing the guidance of the walk along the walk route, the walk guidance mode ends. The owner removes the leash 2 and operates the mobile terminal 3 or the HMI device 28 to notify the vehicle 10 that the walk is complete. As a result, the walk agency service ends. After that, the vehicle 10 automatically travels in order to execute the next task or return to the vehicle storage (basic automatic travel mode).

Additionally, the walk agency service may be provided without the vehicle dispatch service. Specifically, for example, a user (owner) who wishes to receive the walk agency service approaches the vehicle 10 traveling around the user. As a result, the vehicle 10 detects this user and stops. The user uses the mobile terminal 3 to perform a predetermined process required to start using the walk agency service, and then connects the dog 1 to the leash 2 provided in the vehicle 10. Alternatively, the walk agency service may be provided without using the management server by using a method in which the user goes to a predetermined stop and connects the dog 1 to the leash 2 provided in the vehicle 10 waiting there.

1-3. Walk Guidance Mode (Basic Walk Mode)

According to the first embodiment, the automatic travel ECU 64 executes a "basic walk mode", which is one of the walk guidance modes, while the walk agency service is being executed. When walking the dog 1, the dog 1 does not always walk obediently at a constant speed along a predetermined walk route. Therefore, when guiding the dog 1 to walk by using the automatic traveling function of the vehicle 10, some kind of control is required to smoothly guide the walk.

Therefore, the automatic travel ECU 64 executes the basic walk mode in order to smoothly guide the walk of the dog 1 by controlling the distance between the dog 1 and the vehicle 10 (more specifically, for example, the distance between the dog 1 and the center position in the vehicle left-right direction at the front end of the vehicle 10). Hereinafter, this distance is referred to as a "dog-to-vehicle distance D1". It should be noted that the automatic travel ECU 64 corresponds to an example of the "electronic control unit" according to the present disclosure.

1-3-1. Outline of Basic Walk Mode

In the basic walk mode, when the dog 1 is moving along the walk route (i.e., waking or running forward), the dog-to-vehicle distance D1 is controlled so as to maintain a constant distance Dc.

Specifically, the dog-to-vehicle distance D1 changes according to the walking (or running) speed of the dog 1. Therefore, when the dog 1 is moving along the walk route and the speed (vehicle speed) V of the vehicle 10 is lower than an upper limit speed Vmax, the vehicle speed V is controlled so as to maintain the constant distance Dc by using the control of the driving force of the vehicle 10.

Moreover, when the dog 1 is moving along the walk route, after the vehicle speed V reaches the upper limit speed Vmax, the vehicle speed V cannot be increased in order to maintain the constant distance Dc. Therefore, when the vehicle speed V reaches the upper limit speed Vmax, the length of the leash 2 is controlled so as to maintain the constant distance Dc instead of controlling the vehicle speed V. More specifically, the leash 2 is wound by controlling the leash attachment 24 so as to maintain the constant distance Dc. Also, since the leash attachment 24 can lock the leash 2 (i.e., the feed (unwinding) of the leash 2), the leash 2 may be locked so as to maintain the constant distance Dc.

On the other hand, when the dog 1 is moving in a direction away from the walk route, the leash 2 is wound by controlling the leash attachment 24 so as to maintain the constant distance Dc. In this situation, the leash 2 may also be locked so as to maintain the constant distance Dc.

It should be noted that, for the execution of the basic walk mode according to the first embodiment, the following retractable leash attachment (not shown) may be used instead of the leash attachment 24 including the actuator 24b. The leash attachment referred to here is configured to wind a leash by a spring force when no tension is applied to the leash, and includes an actuator that controls a locking device capable of locking the leash.

1-3-2. Flow of Processing Relating to Basic Walk Mode

Figure 6:
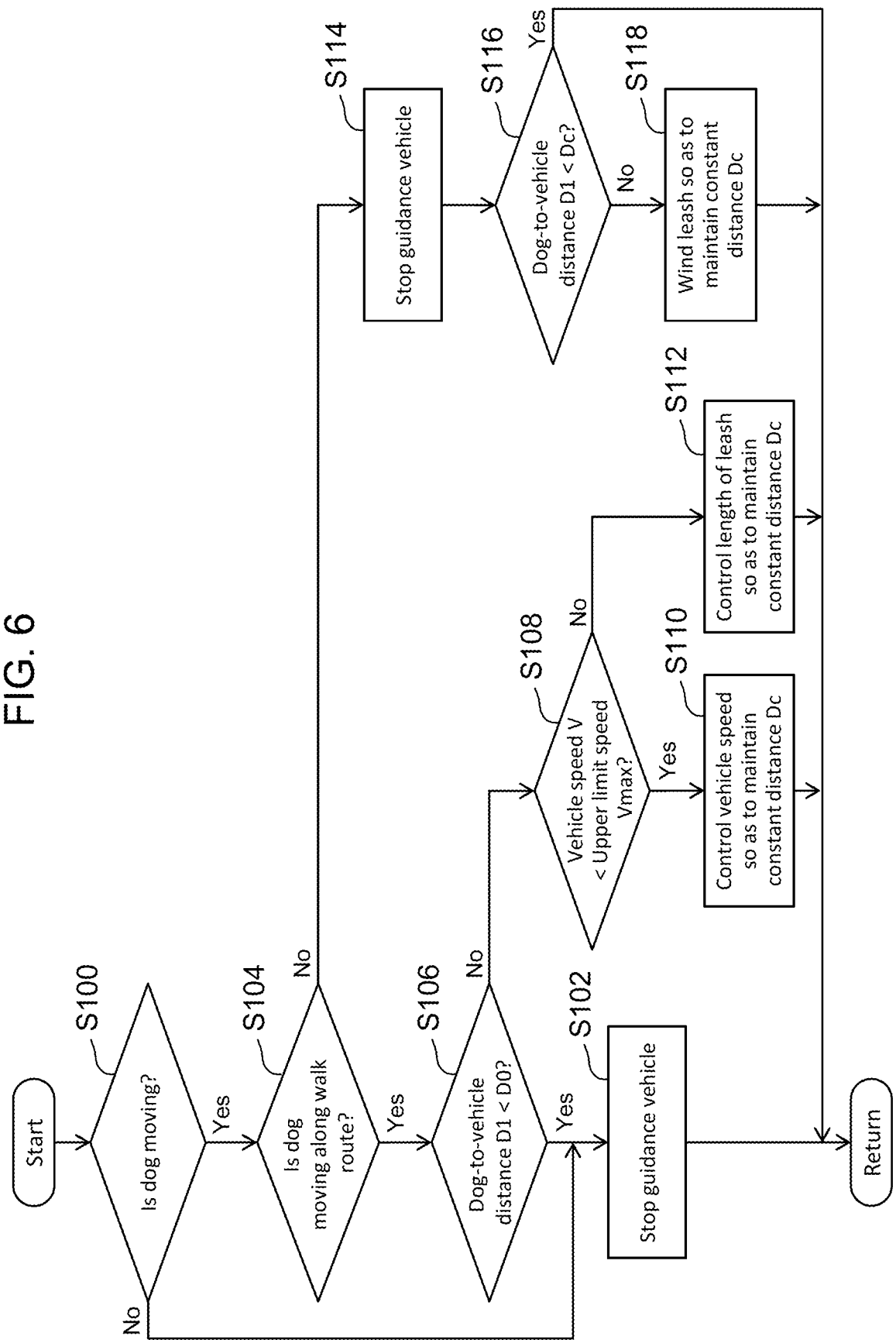
FIG. 6 is a flowchart showing an example of flow of processing relating to a basic walk mode according to the first embodiment.

FIG. 6 is a flowchart showing an example of the flow of processing relating to the basic walk mode according to the first embodiment. The processing of this flowchart is repeatedly executed during the execution of the basic walk mode (i.e., during the provision of the walk agency service).

In FIG. 6, in step S100, the automatic travel ECU 64 (processor 64a) determines whether or not the dog 1 is moving. This determination can be made, for example, using the camera 56 on the front side of the vehicle 10.

When the determination result of step S100 is negative (i.e., when the dog 1 is stationary or sitting, the process proceeds to step S102, and the processor 64a stops the vehicle 10 or maintains the stopped state thereof.

When, on the other hand, the dog 1 is moving in step S100, the process proceeds to step S104. In step S104, the processor 64a determines whether or not the dog 1 is moving along the walk route. Whether or not the dog 1 is moving along the walk route can be determined, for example, using the camera 56 on the front side of the vehicle 10.

When the dog 1 is moving along the walk route in step S104, the process proceeds to step S106. In step S106, the processor 64a determines whether or not the dog-to-vehicle distance D1 is shorter than a predetermined distance D0. The dog-to-vehicle distance D1 can be detected, for example, by using the LIDAR 58 on the front side of the vehicle 10. Therefore, the LIDAR 58 corresponds to an example of the "distance sensor" according to the present disclosure. The predetermined distance D0 is shorter by a predetermined value than the constant distance Dc described above.

When the determination result of step S106 is positive (i.e., when the dog 1 is moving along the walk route and the dog-to-vehicle distance D1 is lower than the predetermined distance D0), the processor 64a maintains the stopped state of the vehicle 10 (step S102). As a result, the vehicle 10 stops until the dog-to-vehicle distance D1 reaches the predetermined distance D0 after the dog 1 starts walking or (running). It should be noted that, instead of this kind of example, even if the dog-to-vehicle distance D1 is shorter than the predetermined distance D0, the vehicle 10 may also start moving as long as the dog 1 starts moving along the walk route.

When, on the other hand, the determination result of step S106 is negative (i.e., when the dog 1 is moving along the walk route and the dog-to-vehicle distance D1 reaches the predetermined distance D0), the process proceeds to step S108. In step S108, the processor 64a determines whether or not the vehicle speed V detected using the IMU 54 is lower than the upper limit speed Vmax.

When the vehicle speed V is lower than the upper limit speed Vmax in step S108, the process proceeds to step S110. In step S110, the processor 64a controls the vehicle speed V so as to maintain the constant distance Dc by controlling the driving force of the vehicle 10. The constant distance Dc is, for example, a fixed value determined in advance, but may be changed in accordance with the walk route, for example.

To be more specific, the vehicle speed control in step S110 can be executed, for example, as follows. That is, the constant distance Dc is used as a target distance. Then, when the dog-to-vehicle distance D1 is shorter than the constant distance Dc (target distance), the processor 64a increases the driving force such that the vehicle speed V increases by a predetermined value. On the other hand, when the dog-to-vehicle distance D1 is longer than the constant distance Dc (target distance), the processor 64a lowers the driving force such that the vehicle speed V decreases by a predetermined value.

When, on the other hand, the vehicle speed V reaches the upper limit speed Vmax in step S108, the process proceeds to step S112. In step S112, the processor 64a drives the actuator 24b to control the length of the leash 2 so as to maintain the constant distance Dc.

To be more specific, the control of the leash length in step S112 can be executed, for example, as follows. That is, the constant distance Dc is used as a target distance. Then, when the dog-to-vehicle distance D1 is shorter than the constant distance Dc (target distance), the processor 64a puts the actuator 24b in an inactive state (i.e., a state in which the main body 24a is rotatable). When, on the other hand, the dog-to-vehicle distance D1 is longer than the constant distance Dc (target distance), the processor 64a drives the actuator 24b to wind the leash 2 by a predetermined length. Furthermore, in the control of the leash length described here, when the dog-to-vehicle distance D1 increases and matches the constant distance Dc (target distance), the processor 64a may lock the leash 2 by driving the actuator 24b (i.e., may fix the length of the leash 2).

On the other hand, when the determination result of step S104 is negative (that is, when the dog 1 is moving in a direction away from the walk route), the process proceeds to step S114. In step S114, the processor 64a stops the vehicle 10 or maintains the stopped state thereof. Thereafter, the process proceeds to step S116.

In step S116, the processor 64a determines whether or not the dog-to-vehicle distance D1 is lower than the constant distance Dc. As a result, when the dog-to-vehicle distance D1 is lower than the constant distance Dc, the processor 64a ends the current processing cycle.

On the other hand, when the dog-to-vehicle distance D1 reaches the constant distance Dc in step S116, the process proceeds to step S118. In step S118, the processor 64a drives the actuator 24b to wind the leash 2 by a predetermined length in order not to exceed the constant distance Dc. In step S118, instead of winding the leash 2, the leash 2 may be locked by driving the actuator 24b.

1-4. Effect of Basic Walk Mode

As described above, according to the basic walk mode of the first embodiment, when the dog 1 is moving along the walk route, the dog-to-vehicle distance D1 is controlled so as to maintain the constant distance Dc. As a result, the distance between the dog 1 and the guidance vehicle 10 can be appropriately controlled, so that the walking of the dog 1 can be smoothly guided.

More specifically, in the first embodiment, when the dog 1 is moving along the walk route and the vehicle speed V is lower than the upper limit speed Vmax, the vehicle speed V is controlled so as to maintain the constant distance Dc. By using the vehicle speed control to maintain the constant distance Dc, the following effect can be obtained. That is, when the winding or locking of the leash 2 is performed in order to maintain the constant distance Dc, high tension may act on the leash 2 even though the dog 1 is moving correctly along the walk route. As a result, the dog 1 may stop walking. In contrast, the vehicle 10 itself performs speed adjustment so as to maintain the constant distance Dc, whereby the dog-to-vehicle distance D1 can be appropriately managed while avoiding high tension acting on the dog 1 via the leash 2 when the dog 1 is moving correctly along the walk route. As a result, the walking can be guided more smoothly.

Moreover, according to the first embodiment, when the dog 1 is moving along the walk route and the vehicle speed V reaches the upper limit speed Vmax, the control of the length of the leash 2 (i.e., the winding or the locking) is performed so as to maintain the constant distance Dc. As a result, even after the vehicle speed V reaches the upper limit speed Vmax, the dog-to-vehicle distance D1 can be controlled so as to maintain the constant distance Dc.

Furthermore, according to the first embodiment, when the dog 1 is moving in a direction away from the walk route, the winding or locking of the leash 2 is performed by controlling the leash attachment 24 so as to maintain the constant distance Dc. This makes is possible to prevent the dog 1 from deviating significantly from the walk route.

Additionally, according to the first embodiment, the control for maintaining the constant distance Dc is changed in accordance with the moving direction of the dog 1, provided that the vehicle speed V is lower than the upper limit speed Vmax. That is, when the dog 1 is moving along the walk route, the vehicle speed control (see step S110) is selected, and, when the dog 1 is moving in a direction away from the walk route, the winding or locking of the leash 2 (see step 118) is selected. The advantages of the vehicle speed control when the dog 1 is moving along the walk route are as described above. Also, when the dog 1 is moving in a direction away from the walk route, it is appropriate to prevent the dog 1 from deviating from the walk route by winding or locking the leash 2. As described above, according to the first embodiment, it is possible to appropriately perform the control for maintaining the constant distance Dc in accordance with the moving direction of the dog 1.

1-5. Other Examples of Basic Walk Mode

Instead of the example of the basic walk mode shown in FIG. 6, when dog 1 is moving along the walk route, the length control of the leash 2 (see step S112) may be executed in order to maintain the constant distance Dc regardless of whether or not the vehicle speed V is lower than the upper limit speed Vmax.

Also, in an example in which a non-windable leash brought by the owner is attached to a leash attachment (leash hook) of a guidance vehicle, the basic walk mode may be executed using only the above-described vehicle speed control (see step S110) performed when the dog is moving along the walk route.

1-6. Examples of Processing Performed with Walk Guidance Mode

During the execution of the walk guidance mode (in the first embodiment, the basic walk mode), the automatic travel ECU 64 may photograph the dog 1 during the walk by using the camera 56 on the front side of the vehicle 10. Then, the automatic travel ECU 64 may transmit the photographed image to the owner's mobile terminal 3 by using the communication device 60. This processing may be executed by a dedicated ECU instead of the automatic travel ECU 64.

Moreover, during the execution of the walk guidance mode, there is a possibility that an abnormality such as poor physical condition (for example, heat stroke) may occur in the dog, an abnormality such as inability to travel may occur in the vehicle 10, or other abnormalities (e.g., trouble between the dog being walked and another dog or another person) may occur. The automatic travel ECU 64 (or a dedicated ECU) may have a function of detecting the above-described abnormalities by using, for example, images photographed by the cameras 56 and a failure diagnosis function (built into the ECU). Then, the automatic travel ECU 64 may notify the owner's mobile terminal 3 or the management server 72 of the content of the detected abnormality by using the communication device 60, or may display the content of the abnormality on the display screen of the HMI device 28 mounted on the vehicle 10.

2. Second Embodiment

A guidance vehicle 80 according to a second embodiment is different from the guidance vehicle 10 according to the first embodiment in that the vehicle 80 is configured to be able to be selectively execute the "walk guidance mode (basic walk mode)" and a "dog operation mode".

2-1. Configuration Example of Guidance Vehicle

Figure 7:
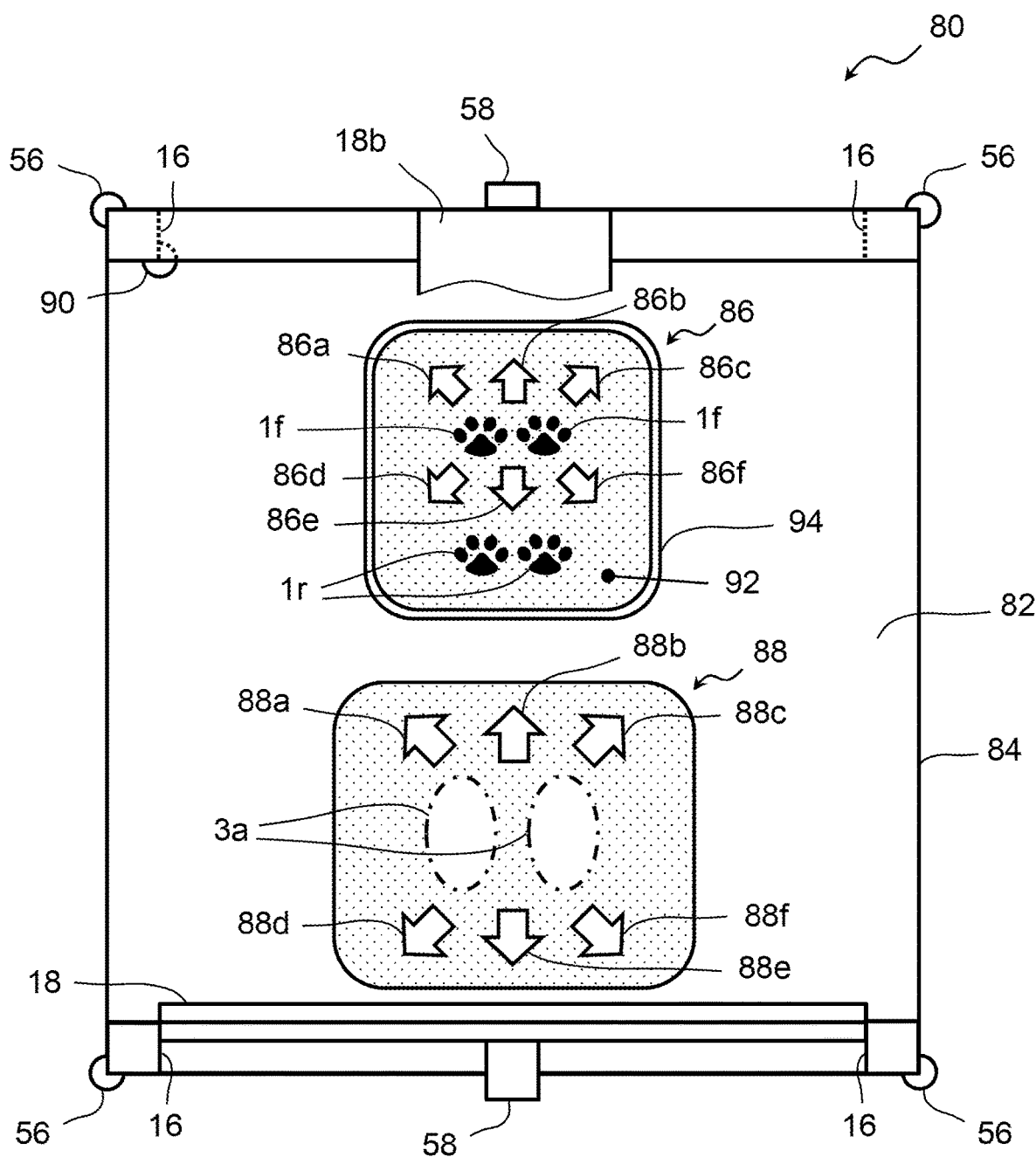
FIG. 7 is a plan view of a guidance vehicle according to a second embodiment.
Figure 8:
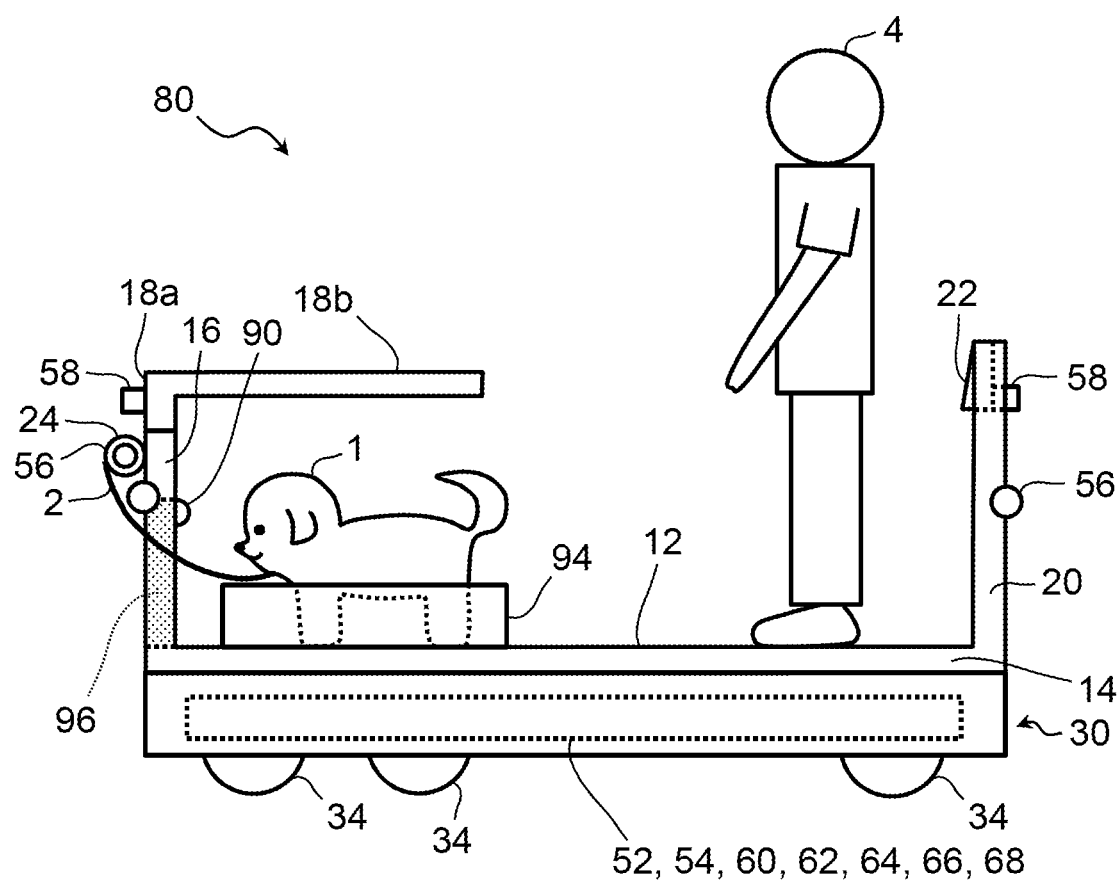
FIG. 8 is a side view of the guidance vehicle shown in FIG. 7.

FIG. 7 is a plan view of the guidance vehicle 80 according to the second embodiment. FIG. 8 is a side view of the guidance vehicle 80 shown in FIG. 7. The configuration of the guidance vehicle 80 according to the second embodiment is the same as the configuration of the vehicle 10 according to the first embodiment, except for the points described below. Additionally, in FIG. 7, the illustration of a part of the top plate portion 18b is omitted.

The vehicle 80 includes a top plate 84 having a riding surface 82 configured for the dog 1 and an owner 4 to ride on. The vehicle 80 also includes a touch sensor 86 for dogs, a touch sensor 88 for humans, and an inward-facing camera 90.

The dog touch sensor 86 is provided on a dog riding section 92 of the riding surface 82. In the example shown in FIG. 7, the dog riding section 92 is provided on the riding surface 82 on the vehicle front side and in the center in the vehicle left-right direction. In order to make it easier for the dog 1 to stay in the dog riding section 92, the riding surface 82 is provided with an enclosure wall 94 formed so as to cover the front, back, left and right of the dog 1 standing in the dog riding section 92. Also, as shown in FIG. 8, the dog 1 standing in the dog riding section 92 can see in front of the vehicle 80 by using an opening 96 formed in the panel 16.

The dog touch sensor 86 forms a bottom surface of the dog riding section 92 located inside the enclosure wall 94. The touch sensor 86 is, for example, a resistance film type sensor or an optical type sensor using infrared rays, and is provided with a plurality (for example, six) dog paw position detectors 86a to 86f. FIG. 7 shows left and right front paw positions 1f and left and right back paw positions 1r, which are assumed paw positions of the dog 1 when riding (these paw positions 1f and 1r are not actually drawn on the riding surface 82). The dog paw position detectors 86a to 86f are located at the left front, the front, the right front, the left rear, the rear, and the right rear with respect to the front paw positions 1f, respectively.

At the installation positions of the dog paw position detectors 86a to 86f on the surface of the touch sensor 86, arrows indicating the six traveling directions of the vehicle 80 (i.e., left front direction, front direction, right front direction, left rear direction, rear direction, and right rear direction) are actually drawn as shown in FIG. 7. Also, the dog paw position detectors 86a to 86f are associated with these six traveling directions, respectively.

The touch sensor 86 is connected to the automatic travel ECU 64. The touch sensor 86 outputs, to the automatic travel ECU 64, a signal indicating the traveling direction associated with any of the dog paw position detectors 86a to 86f stepped on by the front paw of the dog 1. For example, when the dog 1 steps on the dog paw position detector 86a with the front paw, the touch sensor 86 outputs a signal indicating the left front direction.

As a premise, the dog 1 using the vehicle 80 is trained in advance, and understands that the vehicle 80 can be moved by stepping on (touching) the touch sensor 86 with its front paw. Specifically, the dog 1 understands that the vehicle 80 moves by stepping on one of the arrows (dog paw position detectors 86a to 86f) drawn on the riding surface 82 in the dog riding section 92 with its front paw. Further, for each of the arrows, the dog 1 remembers the direction in which the vehicle 80 advances when the arrow is stepped on.

Additionally, when the dog 1 steps on some of the dog paw position detectors 86a to 86f, the touch sensor 86 may be configured to output a signal indicating the traveling direction associated with the dog paw position detectors that the dog 1 first steps on. The touch sensor 86 configured as described above corresponds to an example of the "dog paw position sensor" according to the present disclosure. In another example, the dog paw position sensor may include one or more load sensors or one or more push button switches as one or more dog paw position detectors.

As shown in FIG. 7, the touch sensor 88 for humans is installed on the riding surface 82 on the rear side of the vehicle 10 with respect to the dog touch sensor 86 as an example. Like the touch sensor 86 for dogs, the touch sensor 88 for humans is provided with human foot position detectors 88a to 88f around assumed foot position 3a (dashed line) when riding, which are associated with the six traveling directions of the vehicle 80. Also, the touch sensor 88 is connected to the automatic travel ECU 64.

Additionally, the touch sensor 88 may be configured integrally with the dog touch sensor 86. Also, since dogs have smaller paws (foots) than their owners, the sensitivity of the dog touch sensor 86 may be higher than that of the human touch sensor 88.

The human touch sensor 88 configured as described above corresponds to an example of the "operation device configured for the owner to operate the guidance vehicle" according to the present disclosure. Instead of the example of the touch sensor 88, the operation device may be configured using a load sensor or a push button switch as well as the dog paw position sensor, or may be configured to be installed on the table 18 and operated by the hand of the owner 4, for example.

The inward-facing camera 90 is attached, for example, to the back surface of the panel 16 for photographing the dog riding section 92.

2-2. Dog Operation Mode

In the first embodiment described above, the walk agency service provided by the unmanned vehicle 10 without the owner accompanying the walk has been described. On the other hand, the dog 1 and the owner 4 can ride on the vehicle 80 (the same applies to the vehicle 10). Therefore, according to the vehicle 80, during the execution of the basic walk mode (walk guidance mode), the owner 4 can take a walk with the dog 1, or get on the vehicle 80 to watch the walk of the dog 1 gently. In addition, according to the vehicle 80, when the dog 1 gets tired during the walk, the owner 4 can get on the vehicle 80 with the dog 1 and select the automatic travel mode to return home without walking.

In the second embodiment, as a premise, the vehicle 80 is used by the owner 4 and the dog 1 as follows. That is, in the second embodiment, the owner 4 accompanies the guided walk of the dog 1 by the vehicle 80 using the basic walk mode, and is walking with the dog 1 or riding on the vehicle 80. Then, the vehicle 80 is configured to be able to select the "dog operation mode" described below during the execution of the basic walk mode. That is, in the second embodiment, the vehicle 80 provides a walk assistance service that assists the owner 4 in walking the dog 1.

2-2-1. Outline of Dog Operation Mode

The dog operation mode is one of the travel control modes of the vehicle 80. In the dog operation mode, the automatic travel ECU 64 controls the travel of the vehicle 80 based on the output from the touch sensor 86 (the dog paw position sensor). Additionally, the processing of the automatic travel ECU 64 relating to the dog operation mode may be executed by another ECU (not shown).

Specifically, in the dog operation mode, when the automatic travel ECU 64 receives the output from the touch sensor 86 for dogs, the ECU 64 treats the outputted traveling direction as the traveling direction of the vehicle 80 desired by the dog 1. The automatic travel ECU 64 sets a target travel route based on the traveling direction associated with the output from the touch sensor 86. For example, when the traveling direction is the left front direction, the automatic travel ECU 64 sets a target travel route such that the vehicle 80 travels along the left front direction. The target vehicle speed in the dog operation mode is, for example, a predetermined constant value of an extremely low speed. The automatic travel ECU 64 transmits the set target travel route and target vehicle speed to the travel control ECU 66.

2-2-2. Override Function

As described above, the vehicle 80 includes not only the dog touch sensor 86 but also the human touch sensor 88. Therefore, the owner 4 who got on the vehicle 80 can also operate the vehicle 80 by operating the touch sensor 88.

Moreover, the dog operation mode according to the second embodiment has the following override function. According to this override function, when the input from the dog 1 to the touch sensor 86 (the dog paw position sensor) and the input from the owner 4 to the touch sensor 88 (operation device) are simultaneously present during the execution of the dog operation mode, the travel of the vehicle 80 is controlled based on the output from the human touch sensor 88. In other words, the automatic travel ECU 64 does not accept the output from the dog touch sensor 86 while the outputs are simultaneously present. As described above, according to the override function, the operation of the owner 4 is prioritized over the operation of the dog 1.

2-2-3. Flow of Processing Relating to Execution of Dog Operation Mode

Figure 9:
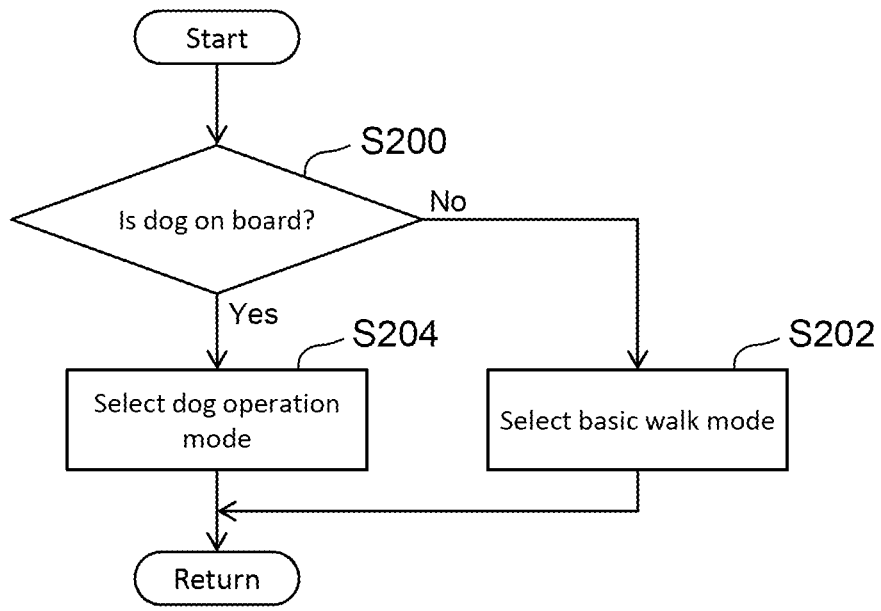
FIG. 9 is a flowchart showing an example of flow of processing relating to switching of a travel mode according to the second embodiment.

FIG. 9 is a flowchart showing an example of the flow of processing relating to the switching of the travel mode according to the second embodiment. The processing of this flowchart is repeatedly executed during the provision of the walk assistance service according to the second embodiment.

In FIG. 9, the automatic travel ECU 64 (processor 64a) determines in step S200 whether or not the dog 1 is on board. This determination can be made, for example, by using the image of the dog riding section 92 photographed by the inward camera 90.

The ride of the dog 1 is typically performed by the owner 4 as follows. The owner 4 who accompanies the walk holds the dog 1 and then puts the dog 1 on the dog riding section 92, or instructs the dog 1 to ride on the dog riding section 92. Alternatively, it is assumed that the dog 1 voluntarily rides on the dog riding section 92 when the dog 1 is tired or bored of walking.

When the ride of the dog 1 is not detected in step S200, the process proceeds to step S202, and the processor 64a selects the basic walk mode. When, on the other hand, the ride of the dog 1 is detected, the process proceeds to step S204, and the processor 64a selects the dog operation mode.

Additionally, unlike the example shown in FIG. 9, the switching from the basic walk mode to the dog operation mode may be performed when the owner 4 who has put the dog 1 on the dog riding section 92 operates the mobile terminal 3 or the HMI device 28 to select (request) the dog operation mode.

Figure 10:
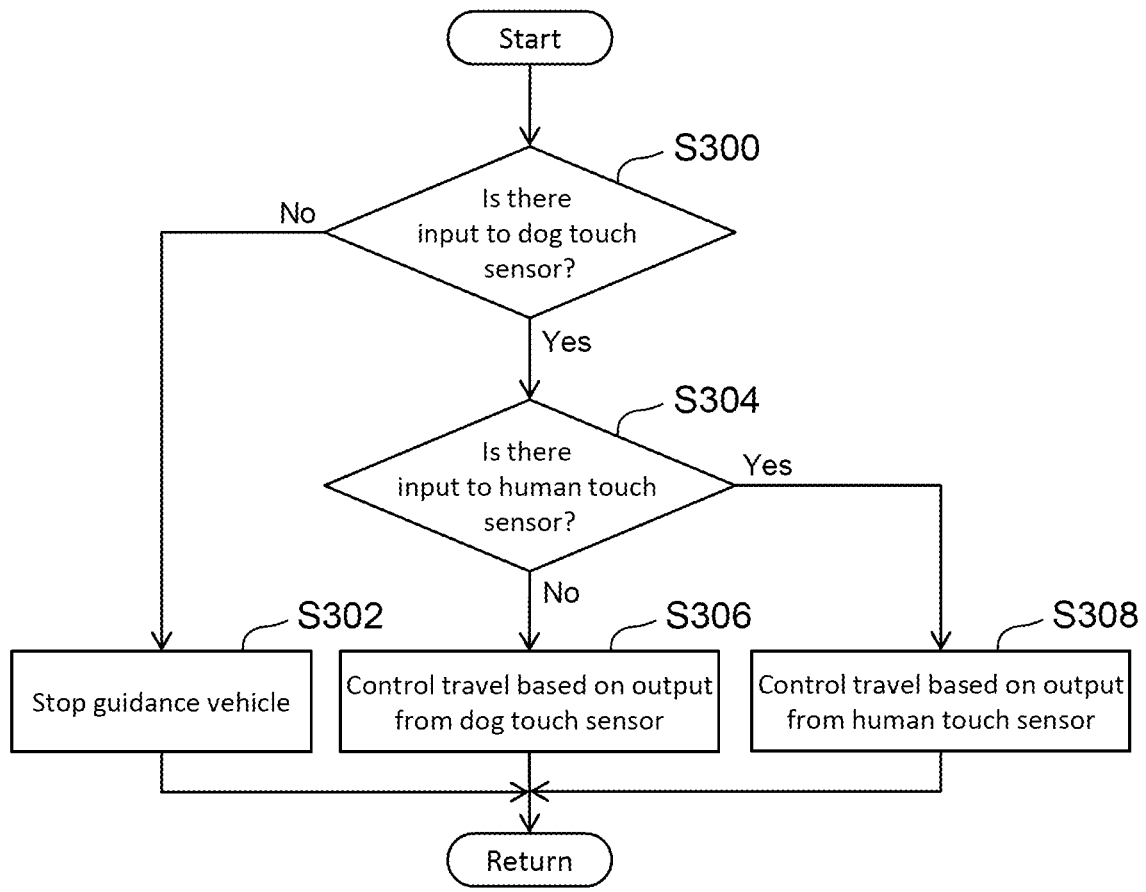
FIG. 10 is a flowchart showing an example of flow of processing relating to a dog operation mode according to the second embodiment.

FIG. 10 is a flowchart showing an example of the flow of processing relating to the dog operation mode (including the override function) according to the second embodiment. The processing of this flowchart is executed during the selection of the dog operation mode in step S204 (see FIG. 9).

In FIG. 10, first, the processor 64a determines in step S300 whether or not there is an input from the dog 1 to the touch sensor 86. As a result, when there is no input to the touch sensor 86, the process proceeds to step S302. In step S302, the processor 64a stops the vehicle 80 or maintains the stopped state of the vehicle 80.

When, on the other hand, there is an input to the touch sensor 86 in step S300, the process proceeds to step S304. In step S304, the processor 64*a* determines whether or not there is an input from the owner 4 to the touch sensor 88.

When there is no input to the touch sensor 88 in step S304 (i.e., when there is only an input to the dog touch sensor 86), the process proceeds to step S306. In step S306, the processor 64*a* controls the travel of the vehicle 80 based on the output from the dog touch sensor 86.

When, on the other hand, there is an input to the touch sensor 88 in step S304 (i.e., when the outputs from both touch sensors 86 and 88 are simultaneously present), the process proceeds to step S308. In step S308, the processor 64*a* does not accept the output from the dog touch sensor 86, but controls the travel of the vehicle 80 based on the output from the human touch sensor 88.

2-3. Effect of Dog Operation Mode

According to the second embodiment described above, it is possible to provide the guidance vehicle 80 that can also be operated by the dog 1 itself.

Moreover, the dog operation mode according to the second embodiment includes the override function described above. According to this override function, while watching the operation of the vehicle 80 by the dog 1, when the vehicle 80 starts to move in an inappropriate direction by the operation of the dog 1, the owner 4 can use the human touch sensor 88 to intervene in the operation of the vehicle 80 and invalidate the operation of the dog 1. As a result, the owner 4 can enjoy the operation of the vehicle 80 together with the dog 1 while giving consideration to the traveling safety of the vehicle 80.

2-4. Other Configuration Examples of Guidance Vehicle According to Second Embodiment The number of dog paw position detectors included in the dog paw position sensor such as the touch sensor 86 is not limited to the example of six shown in FIG. 7, and may be one (e.g., only the front), or plural other than six (e.g., only three of the left front, the front, and the right front). This also applies to the operation device for the owner.

Moreover, the operation device for the owner may have, for example, only the function of stopping the guidance vehicle which is traveling by the operation of the dog. On the other hand, if the automatic travel function of the guide vehicle can be used to ensure the safety of traveling during the operation by the dog, the operation device for the owner does not necessarily have to be provided.

Furthermore, the electronic control unit (e.g., the automatic travel ECU 64) included in the guidance vehicle may be configured to control the actuator 24*b* to automatically wind up the slacked leash when the dog is on board.

3. Third Embodiment

A third embodiment is different from the first embodiment in that the guidance vehicle 10 shown in FIG. 1 additionally performs the following "leash winding control A" during the execution of the basic walk mode. In addition, the leash winding control A may be executed by the guidance vehicle 80 according to the second embodiment.

3-1. Leash Winding Control A

During the execution of the basic walk mode, the dog 1 may react to some presence (e.g., a person, animal or object) in its surroundings, and then suddenly turn around to start running or increase its running speed. If the dog 1 starts running off the walk route, the traveling of the vehicle 10 will be hindered. Also, if the dog 1 suddenly runs toward a surrounding person or animal (for example, another dog) and tries to jump, the surrounding person or animal will be surprised.

In view of the issue described above, the basic walk mode according to the third embodiment is executed with the leash winding control A. According to this leash winding control A, when at least one of the feed speed of the leash 2, the feed acceleration thereof, and the load acting on the leash 2 exceeds the corresponding threshold values TH1 to TH3, the winding of the leash 2 is performed by the control of the leash attachment 24 (actuator 24*b*).

Figure 11:
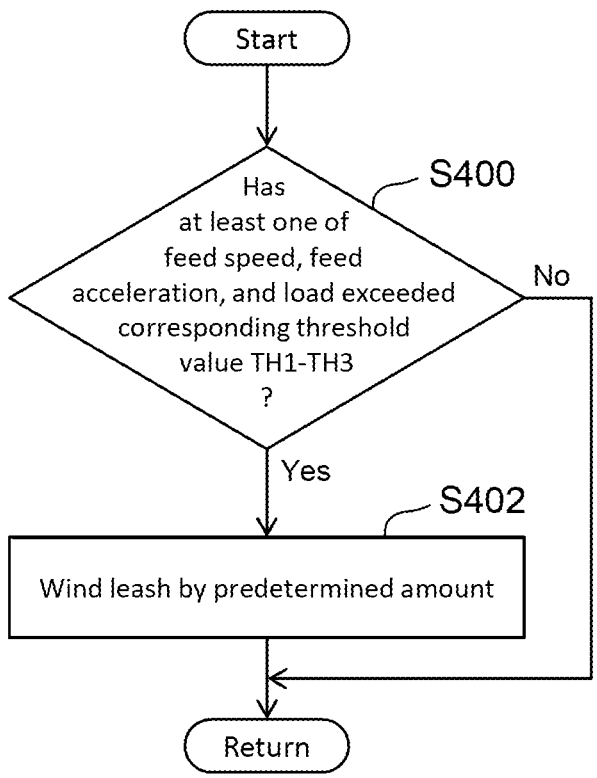
FIG. 11 is a flowchart showing an example of processing of a leash winding control A according to a third embodiment.

FIG. 11 is a flowchart showing an example of the processing of the leash winding control A according to the third embodiment. The processing of this flowchart is repeatedly executed during the execution of the basic walk mode.

In FIG. 11, first, the automatic travel ECU 64 (processor 64*a*) determines in step S400 whether or not at least one of the feed speed, the feed acceleration, and the load, which are parameters indicating the state of the leash 2, exceeds the corresponding threshold values TH1 to TH3. The values of these parameters are detected using the leash state sensor 26. Also, each of the threshold values TH1 to TH3 is determined in advance so as to be an appropriate value for reducing the deviation of the walk route and the jumping by the dog 1.

When the determination result of step S400 is negative, the processor 64*a* ends the current processing cycle. When, on the other hand, the determination result is positive, the process proceeds to step S402. In step S402, the processor 64*a* controls the leash attachment 24 (actuator 24*b*) to wind the leash 2 by a predetermined amount.

It should be noted that, instead of the example described above, in an example including a leash state sensor configured to detect only one or two of the three parameters of the fee speed, the feed acceleration, and the load, the leash winding control A may be executed using only the one or two parameters.

3-2. Effect of Leash Winding Control A As described above, the basic walk mode according to the third embodiment is executed with the leash winding control A using the parameters indicating the state of the leash 2 (the feed speed, the feed acceleration, and the load). Thus, when the dog 1 reacts to some presence around the dog 1 during the execution of the basic walk mode, it is possible to prevent the dog 1 from running out of the walk route, and as a result, the dog 1 can be prevented from hindering the traveling of the guidance vehicle 10. In addition, it is possible to prevent the dog 1 from jumping to the surrounding person or animal, and as a result, the dog 1 can be prevented from astonishing the surrounding person or animal.

To be more specific, by detecting that the feed speed of the leash 2 exceeds the threshold value TH1, it can be determined that the dog 1 that is already walking has started running and the running speed thereof has increased, and that the running speed of the dog 1 that is already running has increased. Then, when the dog 1 increases the running speed in this manner, it is considered that the dog 1 may be reacting to some presence in its surroundings. Therefore, by winding the leash 2 when the feed speed exceeds the threshold value TH1, it is possible to prevent the dog 1 from running off the walk route or trying to jump to the surrounding person or animal.

Moreover, the fact that the dog 1 suddenly starts running can be determined by detecting that the feed acceleration of the leash 2 exceeds the threshold value TH2. Then, even when the dog 1 suddenly starts running in this way, it is considered that the dog 1 may be reacting to some presence in its surroundings. Therefore, by winding the leash 2 when the feed acceleration exceeds the threshold value TH2, it is possible to prevent the dog 1 from running off the walk route or trying to jump to the surrounding person or animal.

Furthermore, the load acting on the leash 2 can be detected in a situation where the feed of the leash 2 is already locked. During the execution of the basic walk mode, when the vehicle speed V reaches the upper limit speed Vmax while the dog 1 is moving along the walk route (see step S112 in FIG. 6), or when the dog 1 moves away from the walk route and then reaches the constant distance Dc (see step S118 in the same figure), the leash 2 may be locked. In this kind of situation where the leash 2 is locked, it can be determined that the force of pulling the leash 2 becomes stronger due to the increase in the momentum of the dog 1 by detecting that the load acting on the leash 2 exceeds the threshold value TH3. Then, even when the dog 1 strengthens the force of pulling the leash 2 in this manner, it is considered that the dog 1 may be reacting to some presence in its surroundings. Therefore, by winding the leash 2 when the load exceeds the threshold value TH3, it is possible to prevent the dog 1 from running off the walk route or trying to jump to the surrounding person or animal in the example of step S112. In addition, in the example of step S118, it is possible to prevent the dog 1 from trying to jump to the surrounding person or animal Additionally, in the example in which the owner 4 is accompanied by the basic walk mode, according to the leash winding control A, since the owner 4 does not need to have the leash 2, it is possible to prevent the owner 4 from losing his/her balance in order to reduce the sudden movement of the dog 1. Therefore, even elderly people who have anxiety about their legs and back can walk their dogs with peace of mind.

3-3. Leash Lock Control A

Figure 12:
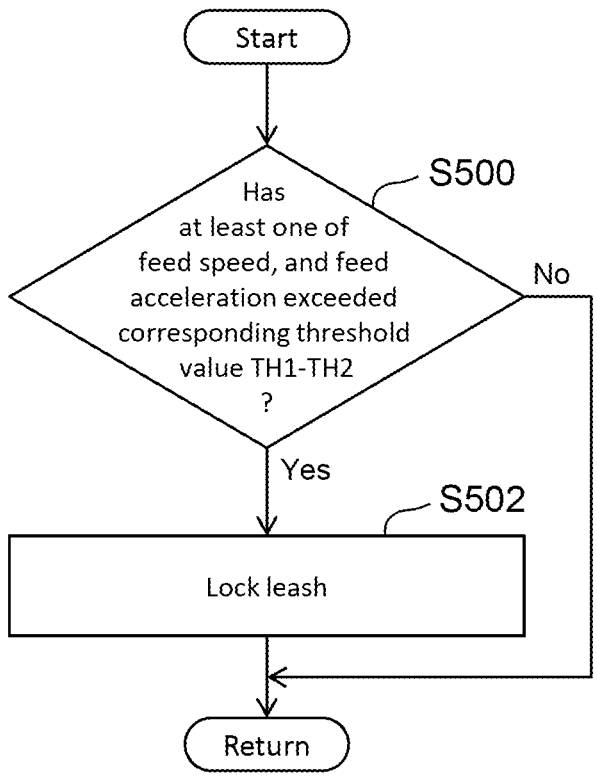
FIG. 12 is a flowchart showing an example of processing of a leash lock control A related to the third embodiment.

The basic walk mode may be performed with the following leash lock control A instead of the leash winding control A. FIG. 12 is a flowchart showing an example of the processing of the leash lock control A related to the third embodiment. The processing of this flowchart is also repeatedly executed during the execution of the basic walk mode.

In FIG. 12, first, the processor 64a determines in step S500 whether or not at least one of the feed speed and the feed acceleration exceeds the corresponding threshold values TH1 and TH2.

When the determination result of step S500 is negative, the processor 64a ends the current processing cycle. When, on the other hand, the determination result is positive, the process proceeds to step S502. In step S502, the processor 64a controls the leash attachment 24 (actuator 24b) to lock the leash 2.

As described above, the load acting on the leash 2 can be detected in a situation where the leash 2 is already locked. Therefore, in the leash lock control A, only the feed speed and the feed acceleration are used as parameters indicating the state of the leash 2.

Even with the leash lock control A described above, when the dog 1 reacts to some presence around the dog 1 during the execution of the basic walk mode, it is possible to prevent the dog 1 from running out of the walk route and from trying to jump to the surrounding person or animal.

It should be noted that, instead of the example described above, in an example including a leash state sensor configured to detect only either one of the two parameters of feed speed and feed acceleration, the leash lock control A may be performed using only the one parameter.

4. Fourth Embodiment

A fourth embodiment is different from the first embodiment in that the guidance vehicle 10 shown in FIG. 1 additionally performs the following "leash winding control B" during the execution of the basic walk mode. In addition, the leash winding control B may be performed by the guidance vehicle 80 according to the second embodiment, or may be performed in combination with the third embodiment.

4-1. Leash Winding Control B

The leash winding control B according to the fourth embodiment is executed in order to reduce the jumping of the dog 1 onto a surrounding person or animal, which is one of the additional issues described in the third embodiment. According to the leash winding control B, when a distance D2 between a person or animal around the dog 1 and the dog 1 is shorter than a threshold value Dth during the execution of the basic walk mode, the leash attachment 24 (actuator 24b) is controlled to wind the leash 2.

Figure 13:
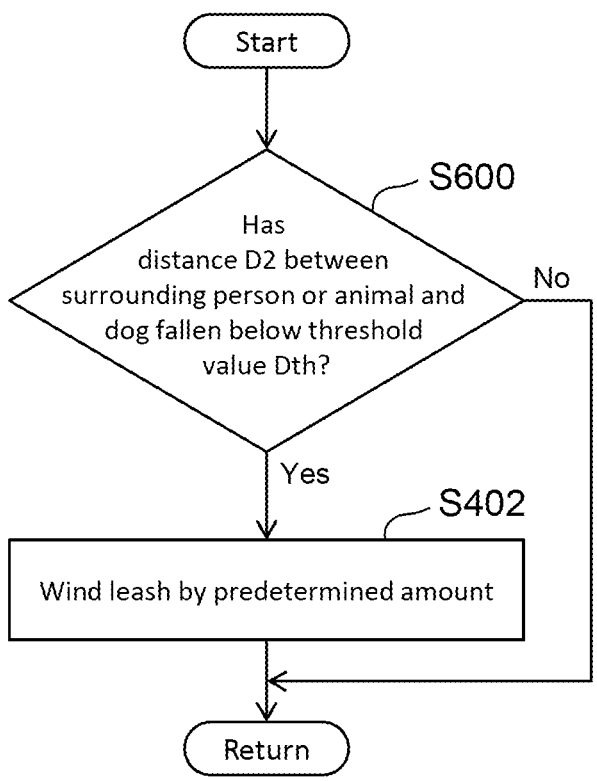
FIG. 13 is a flowchart showing an example of processing of a leash winding control B according to a fourth embodiment.

FIG. 13 is a flowchart showing an example of the processing of the leash winding control B according to the fourth embodiment. The processing of this flowchart is repeatedly executed during the execution of the basic walk mode.

In FIG. 13, first, the automatic travel ECU 64 (processor 64a) determines in step S600 whether or not the distance D2 between a person or animal around the dog 1 and the dog 1 is shorter than the threshold value Dth. This distance D2 can be detected by using, for example, the LIDAR 58 or the camera 56 on the front side of the vehicle 10, which corresponds to an example of the "distance sensor" according to the present disclosure. Also, the threshold value Dth is determined in advance so as to be an appropriate value for reducing the jumping by the dog.

When the determination result of step S600 is negative, the processor 64a ends the current processing cycle. When, on the other hand, the determination result is positive, the process proceeds to step S602, and the processor 64a controls the leash attachment 24 (actuator 24b) to wind the leash 2 by a predetermined amount.

4-2. Effect of Leash Winding Control B

When the distance D2 between the surrounding person or animal and the dog 1 becomes short, the dog 1 may jump onto the surrounding person or animal. According to the leash lock control B of the fourth embodiment, the leash 2 is wound when the distance D2 becomes shorter than the threshold value Dth. Therefore, similarly to the leash winding control A of the third embodiment, the leash winding control B can also prevent the dog 1 from jumping onto the surrounding person or animal.

4-3. Leash Lock Control B

The basic walk mode may be executed with the following leash lock control B instead of the leash winding control B. Specifically, the leash lock control B can be realized by, for example, the following processing. That is, for example, when the distance D2 is shorter than the threshold value Dth in step S600 shown in FIG. 13, the process proceeds to step S502 instead of step S402. The processor 64a then controls the leash attachment 24 (actuator 24b) to lock the leash 2. The leash lock control B also has the similar effect to the leash winding control B.

5. Fifth Embodiment

A fifth embodiment is different from the first embodiment in that the walk guidance mode includes the following "discipline mode" together with the basic walk mode. The following description will be given by taking the guidance vehicle 10 as an example. However, the "discipline mode" may be executed by the guidance vehicle 80 according to the second embodiment, or may be executed in combination with the third or fourth embodiment.

5-1. Discipline Mode

The discipline mode is executed in a part or all sections of the walk route in accordance with a request from the owner 4. If the walk route includes a section other than the discipline mode execution section, the basic walk mode is executed in the section.

To be more specific, for example, the owner 4 requests the execution of the discipline mode when reserving the dispatch of the vehicle 10 using the mobile terminal 3. Alternatively, the owner 4 may operate the HMI device 28 of the dispatched vehicle 10 to request the execution of the discipline mode. This kind of request from the owner 4 may include information on a section in which the discipline mode is desired to be executed, as well as selection of a desired walk route. Alternatively, the discipline mode execution section may be set on the side of the automatic travel ECU 64 (or a dedicated ECU) of the vehicle 10 to be dispatched or the management server 72. Furthermore, in an example in which the owner 4 accompanies the walk, the owner 4 may operate the mobile terminal 3 or the HMI device 28 during the execution of the guided walk in the basic walk mode to switch the travel control mode between the basic walk mode and the discipline mode.

Figure 14:
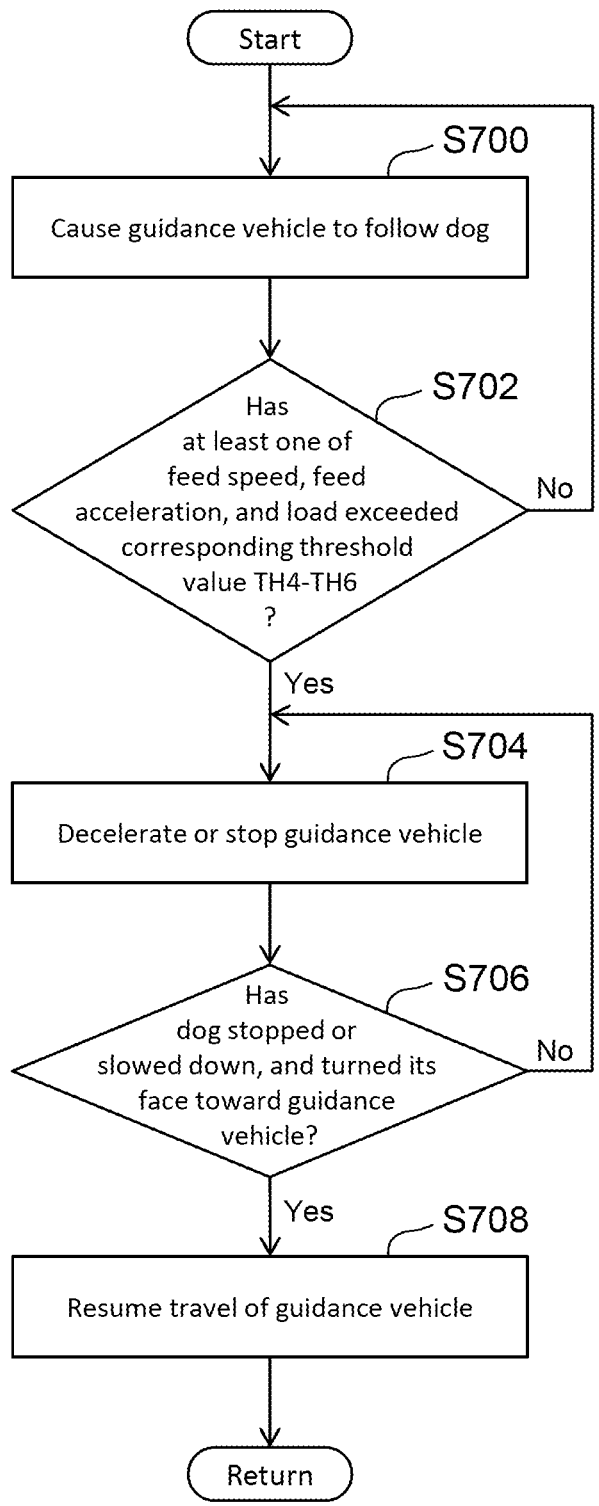
FIG. 14 is a flowchart showing an example of flow of main processing in a discipline mode according to a fifth embodiment.

FIG. 14 is a flowchart showing an example of the flow of main processing in the discipline mode according to the fifth embodiment. The processing of this flowchart is started after the dog 1 starts moving along the walk route after the discipline mode is selected, and is repeatedly executed during the selection of the discipline mode. That is, if the dog 1 moves off the walk route after the selection of the discipline mode, the vehicle 10 is stopped, and the processing of this flowchart is not executed.

Moreover, when the dog 1 moves in a direction away from the walk route after the start of the processing of this flowchart (i.e., during the execution of the processing), the vehicle 10 is stopped. When the dog 1 starts moving along the walk route again after that, the processing is restarted from step S700. In addition, if the dog 1 moves away from the walk route and the dog-to-vehicle distance D1 reaches the constant distance Dc during the execution of the discipline mode, the winding or locking of the leash 2 is performed in the same manner as during the execution of the basic walk mode.

In FIG. 14, first, in step S700, the automatic travel ECU 64 (processor 64*a*) causes the vehicle 10 to follow the dog 1. Thereafter, the process proceeds to step S702. In addition, the processing of step S700 includes a process of locking the leash 2 when the dog-to-vehicle distance D1 exceeds a predetermined distance (e.g., constant distance Dc). The reason is that the load is included in the parameters used for the determination in the next step S702.

In step S702, the processor 64*a* determines whether or not at least one of the feed speed, the feed acceleration, and the load, which are parameters indicating the state of the leash 2, exceeds the corresponding threshold values TH4 to TH6. Each of the threshold values TH4 to TH6 are determined in advance so as to be an appropriate value for discipline of the dog 1. In addition, the threshold value TH4 of the feed speed may be set in consideration of the walking speed of the owner 4 when the owner 4 walks with the dog 1.

When the determination result of step S702 is negative, the processor 64*a* repeatedly executes the process step S700 and the subsequent processes. That is, as long as the dog 1 is moving along the walk route, the vehicle 10 continues to travel.

When, on the other hand, the determination result of step S702 is positive, it can be determined that the dog 1 is not well-behaved for a walk. The reason why this judgment can be made is as follows. That is, when the feed speed exceeds the threshold value TH4, it can be seen that the walking (or running) speed of the dog 1 is too high. Also, when the feed acceleration exceeds the threshold value TH5, it can be seen that the dog 1 suddenly starts to run. Furthermore, when the load exceeds the threshold value TH6, it can be seen that the dog 1 is pulling the leash 2 strongly.

Accordingly, when the determination result of step S702 is positive, the process proceeds to step S704, and the processor 64*a* decelerates or stops the vehicle 10. Thereafter, the process proceeds to step S706.

In step S706, the processor 64*a* determines whether or not the dog 1 has stopped or slowed down in response to the deceleration or stop of the vehicle 10 and turned its face toward the vehicle 10. Whether or not the dog 1 has turned its face toward the vehicle 10 can be determined by using, for example, the camera 56 on the front side of the vehicle 10.

The processor 64*a* continues the process of step S704 while the determination result of step S706 is negative. On the other hand, when the determination result becomes positive, the process proceeds to step S708. In step S708, the processor 64*a* resumes the travel of the vehicle 10 (in other words, releases the deceleration or stop of the vehicle 10 by the process of step S704). As a result, the processes of step S700 and the subsequent steps are repeatedly executed on condition that the dog 1 moves along the walk route.

5-2. Effect of Discipline Mode

According to the discipline mode of the fifth embodiment described above, when the dog 1 takes an action in which the determination result of step S702 becomes positive, the guidance vehicle 10 is decelerated or stopped until the dog 1 stops or slows down and turns its face toward the vehicle 10. By repeatedly executing this kind of discipline mode, the dog 1 can be disciplined such that the dog 1 can take a walk in a well-behaved manner. As a result, the dog 1 can be safely walked.

More specifically, it is possible to prevent or correct the habit of walking (or running) too fast, the habit of running suddenly, and the habit of pulling the leash 2 strongly. In addition, it is also possible for the dog 1 to have a habit of walking according to the owner 4 when the dog 1 takes a one-to-one walk with the owner 4.

5-3. Other Examples of Discipline Mode

Instead of the example described above, in an example including a leash state sensor configured to detect only one or two of the three parameters of the feed speed, the feed acceleration, and the load, the discipline mode may be executed using only the one or two parameters.

Moreover, the discipline mode may be executed by the following procedure. As a premise, the vehicle 10 is provided with a push button (not shown) configured for the owner 4 to operate the lead attachment 24 (actuator 24*b*). The processor 64*a* causes the vehicle 10 to travel so as to follow the dog 1. Then, the owner 4 who got on the vehicle 10 operates the push button at the judgment of the owner 4 himself/herself while the vehicle 10 is traveling in order to wind or lock the leash 2. In association with this, the processor 64*a* decelerates or stops the vehicle 10. After that, when the dog 1 stops for a predetermined time (for example, several seconds), the owner 4 operates the push button to appropriately feed (unwind) the leash 2 or release the lock, thereby loosening the tension of the leash 2.

Furthermore, in the discipline mode, the following control may be additionally executed. That is, when the discipline mode is performed near a road on which automobiles travel, the processor 64a causes the vehicle 10 to advance only when the dog 1 is on the opposite side of the road with respect to the vehicle 10 (in Japan, when the dog 1 is on the left side in the traveling direction of the vehicle 10). The position of the dog 1 with respect to the vehicle 10 can be detected using, for example, the camera 56. This makes it possible for the dog 1 to have a habit of walking on the side far from the road.

6. Sixth Embodiment

The dog 1 may excrete during the execution of the walk guidance mode. If the guidance vehicle 10 moves near the dog 1 that is excreting, the dog 1 may feel stress and may be unable to excrete well.

In view of the additional issue described above, in a sixth embodiment, the guidance vehicle 10 additionally executes the following "learning process of pre-excretion behavior" and "vehicle stop process when pre-excretion behavior is detected" during the execution of the basic walk mode (walk guidance mode). The sixth embodiment is different from the first embodiment in this respect. In addition, these processes may be executed by the guidance vehicle 80 according to the second embodiment or may be combined with other third to fifth embodiments. Also, these processes may be executed during the execution of the "discipline mode" described above, which is another example of the walk guidance mode.

6-1. Learning Process of Pre-Excretion Behavior

Figure 15:
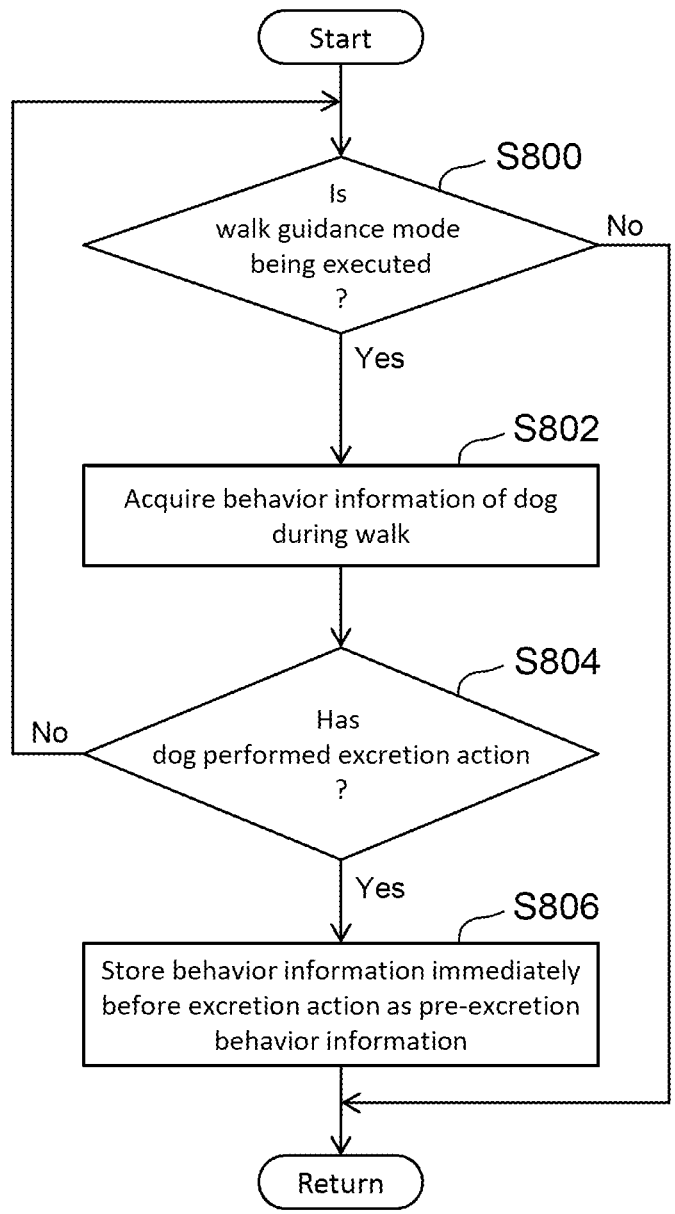
FIG. 15 is a flowchart showing an example of a learning process of a pre-excretion behavior according to a sixth embodiment.

The automatic travel ECU 64 (or a dedicated ECU) executes the learning process to learn the pre-excretion behavior of the dog 1. FIG. 15 is a flowchart showing an example of the learning process of the pre-excretion behavior according to the sixth embodiment.

In FIG. 15, first, the automatic travel ECU 64 (processor 64a) determines in step S800 whether or not the walk guidance mode is being executed. As a result, when the walk guidance mode is not being executed, the processor 64a ends the current processing cycle.

When, on the other hand, the walk guidance mode is being executed in step S800, the process proceeds to step S802. In step S802, the processor 64a acquires the behavior information of the dog 1 during a walk using a behavior sensor, and temporarily stores the acquired behavior information in the storage device 64b. The behavior sensor is, for example, the camera 56 on the front side of the vehicle 10 capable of photographing the dog 1, or the LIDAR 58 on the front side of the vehicle 10. The behavior information is, for example, an image (still image or moving image) of the dog 1 photographed by the camera 56, and the walking speed of the dog 1 detected by the camera 56 or the LIDAR 58.

In step S804 following step S802, the processor 64a determines whether or not the dog 1 has excreted (urine or poop). This determination can be made, for example, by using the camera 56 on the front side of the vehicle 10. More specifically, this determination is performed, for example, by utilizing an image recognition function using machine learning provided in the processor 64a and also considering the posture of the dog 1 at the time of excretion. While the dog 1 is not excreted, the processor 64a repeatedly executes the processes after step S800 (i.e., the behavior information is constantly acquired).

When, on the other hand, the processor 64a determines in step S804 that the dog 1 has excreted, the process proceeds to step S806. In step S806, the processor 64a stores, in the storage device 64b, the behavior information of the dog 1 immediately before the current excretion action determined in step S804 as the pre-excretion behavior information.

Examples of the pre-excretion behavior include a slowing down of walking speed of the dog 1, a start of smelling the grass by the dog 1, and an approach of the dog 1 to a utility pole.

According to the learning process of the flowchart shown in FIG. 15 described above, it is possible to learn the pre-excretion behavior of the dog 1 based on the behavior information of the dog 1 acquired by the behavior sensor during the execution of the walk guidance mode such as the basic walk mode.

6-2. Vehicle Stop Process When Pre-Excretion Behavior Is Detected

Figure 16:
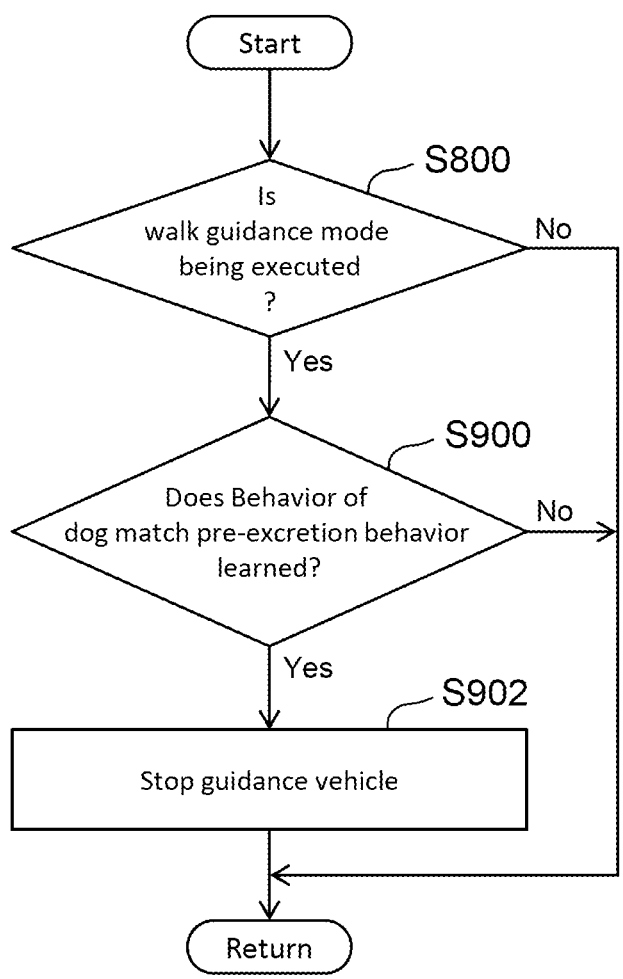
FIG. 16 is a flowchart showing an example of a vehicle stop process according to the sixth embodiment.

FIG. 16 is a flowchart showing an example of the vehicle stop process according to the sixth embodiment.

In FIG. 16, when the walk guidance mode is being executed in step S800, the process proceeds to step S900. In step 900, the processor 64a detects the current behavior of the dog 1 using the behavior sensor (e.g., the camera 56 or the LIDAR 58), and then determines whether or not the detected behavior matches one of the learned pre-excretion behaviors by the learning process described above.

When the determination result of step 900 is negative, the processor 64a ends the current processing cycle. When, on the other hand, the determination result is positive, the process proceeds to step S902. In step S902, the processor 64a executes the vehicle stop process, that is, stops the vehicle 10.

According to the vehicle stop process of the flowchart shown in FIG. 16 described above, the vehicle 10 can be stopped when the behavior taken by the dog 1 during the execution of the walk guidance mode matches the pre-excretion behavior learned by the learning process.

6-3. Effect

According to the learning process and the vehicle stop process according to the sixth embodiment described above, the automatic travel ECU 64 predicts that the dog 1 will perform the excretion action, and the guidance vehicle 10 can be stopped in advance (that is, before the dog 1 actually starts the excretion action). Therefore, the dog 1 can excrete without stress.

Additionally, as another example for enabling the dog 1 to perform the excretion action without stress, unlike the sixth embodiment, the following processing may be performed. That is, for example, the GNSS receiver 62 and the camera 56 are used to learn (store) the place where the dog 1 actually excretes. Then, every time the vehicle 10 passes through the learned excretion place during the execution of the walk guidance mode, the vehicle 10 is decelerated in preparation for the case where the dog 1 performs the excretion action.

7. Seventh Embodiment

The dog 1 may excrete during the execution of the walk guidance mode. For beautification of the city or town, a guidance vehicle according to a seventh embodiment if different from the first embodiment except that the guidance vehicle itself is configured to be able to remove the poop and urine produced by the dog 1. In addition, this kind of configuration according to the seventh embodiment may be combined with other second to sixth embodiments.

7-1. Configuration Example of Guidance Vehicle

Figure 17:
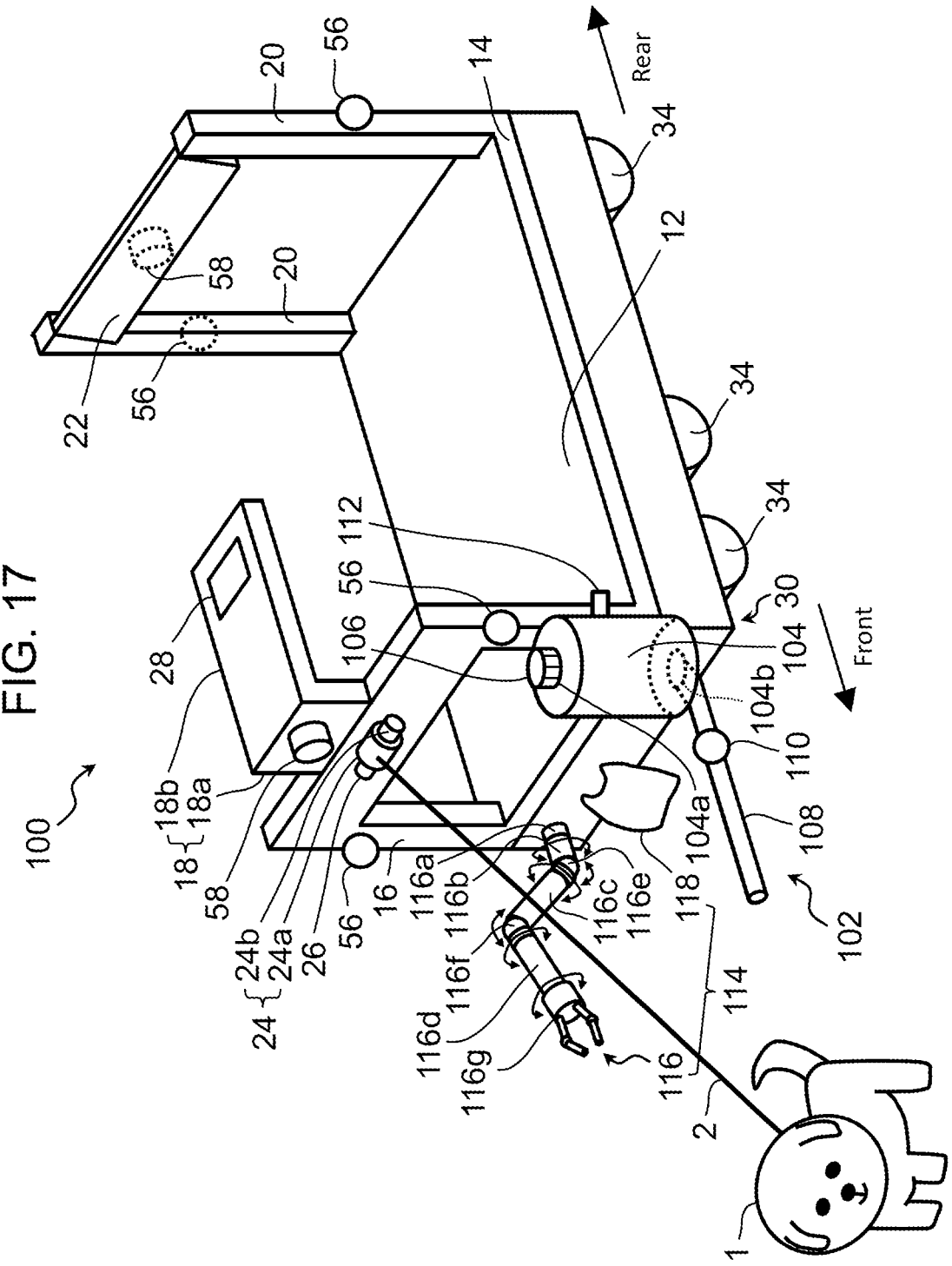
FIG. 17 is a perspective view of a guidance vehicle according to a seventh embodiment.

FIG. 17 is a perspective view of a guidance vehicle 100 according to the seventh embodiment. The configuration of the guidance vehicle 100 according to the seventh embodiment is the same as the configuration of the guidance vehicle 10 according to the first embodiment, except for the points described below.

The vehicle 100 is equipped with a water discharger 102 having a configuration as shown in FIG. 17 as an example in order to water the urine produced by the dog 1 during the execution of the walk guidance mode. The water discharger 102 is arranged, for example, at a portion on the front side of the vehicle 100 as in the example shown in FIG. 17.

The water discharger 102 has a tank 104 for storing water for urine. The tank 104 is attached to the front surface of the panel 16. A water supply port 104a is formed at an upper end portion of the tank 104. The tank 104 is provided with a lid 106 for opening and closing the water supply port 104a.

The water discharger 102 is configured to be able to discharge the water in the tank 104. Specifically, the water discharger 102 includes a hose 108 for discharging water toward the urine and a valve 110. One end of the hose 108 is connected to a lower end portion 104b of the tank 104, and the other end faces the front of the vehicle 100. The valve 110 is electrically driven, for example, and opens and closes the flow path in the hose 108. The valve 110 is connected to the automatic travel ECU 64 (or a dedicated ECU) configured to control the water discharger 102, and is opened and closed in accordance with a command from the automatic travel ECU 64.

The water discharger 102 further includes a water quantity sensor 112 configured to detect the quantity of water in the tank 104.

Moreover, the vehicle 100 is equipped with a collection device 114 in order to collect the poop produced by the dog 1 during the execution of the walk guidance mode. Similarly to the water discharger 102, the collection device 114 is also arranged, for example, at a portion on the front side of the vehicle 100 as in the example shown in FIG. 17.

In the example shown in FIG. 17, the collection device 114 includes a collection arm 116 for collecting poop, and a collection bag 118 for storing the collected poop. The collection arm 116 and the collection bag 118 are attached to, for example, a portion of the chassis unit 30 on the front side of the vehicle 100.

The collection arm 116 includes a fixing portion 116a of the chassis unit 30, three links 116b, 116c, and 116d, two joints 116e and 116f, and a hand 116g. The hand 116g is located at the distal end of the collection arm 116, and can pick up the poop. These seven arm components 116a to 116g are rotatably or bendably connected to each other as shown by arrows in FIG. 17. Further, an actuator (e.g., an electric motor) which is not shown is installed in each of the six arm components 116b to 116g. These actuators are connected to the automatic travel ECU 64.

The collection arm 116 configured as described above can rotate or bend each of the connecting portions of the arm components 116a to 116g in accordance with a commands from the automatic travel ECU 64. In this manner, the position of the hand 116g with respect to the vehicle 100 can be controlled with a high degree of freedom. In addition, the "collection device" according to the present disclosure may be, for example, a vacuum type capable of sucking and collecting poop instead of the example of using the collection arm 116.

7-2. Water Discharge Process

The automatic travel ECU 64 is configured to execute a water discharge process that controls the water discharger 102 so as to sprinkle water on the urine when the ECU 64 detects that the dog 1 has urinated during the execution of the walk guidance mode.

Figure 18:
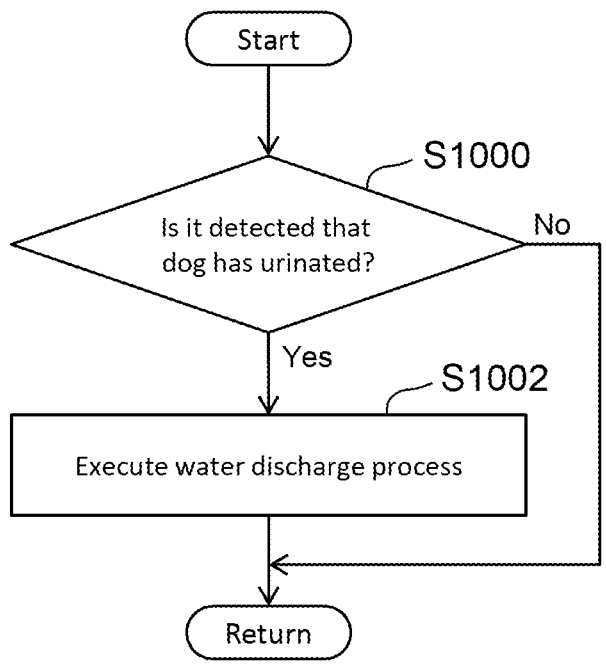
FIG. 18 is a flowchart showing an example of a water discharge process according to the seventh embodiment.

FIG. 18 is a flowchart showing an example of the water discharge process according to the seventh embodiment. The processing of this flowchart is repeatedly executed during the execution of the walk guidance mode such as the basic walk mode.

In FIG. 18, first, the automatic travel ECU 64 (processor 64a) determines in step S1000 whether or not the dog 1 has urinated. According to the camera 56 arranged on the front side of the vehicle 100, the dog 1 and its surroundings can be photographed. Therefore, this determination can be performed based on, for example, an image photographed by the cameras 56, similarly to the determination of step S804 described above.

When the determination result of step S1000 is negative, the processor 64a ends the current processing cycle. When, on the other hand, it is detected that the dog 1 has urinated, the process proceeds to step S1002.

In step S1002, the processor 64a executes the water discharge process to control the water discharger 102 so as to sprinkle water on the urine produced by the dog 1. More specifically, in the example shown in FIG. 18 using the water discharger 102, the water discharge process includes a process in which the vehicle 100 is automatically driven so as to align the tip of the hose 108 with the position of the urine by using, for example, the camera 56. Then, in the water discharge process, the valve 110 is opened with the tip of the hose 108 aligned with the position of the urine. This allows water to be sprinkled on the urine.

7-3. Collection Process

The automatic travel ECU 64 is configured to execute a collection process to control the collection device 114 so as to collect the poop when the ECU 64 detects that the dog 1 has pooped during the execution of the walk guidance mode.

Figure 19:
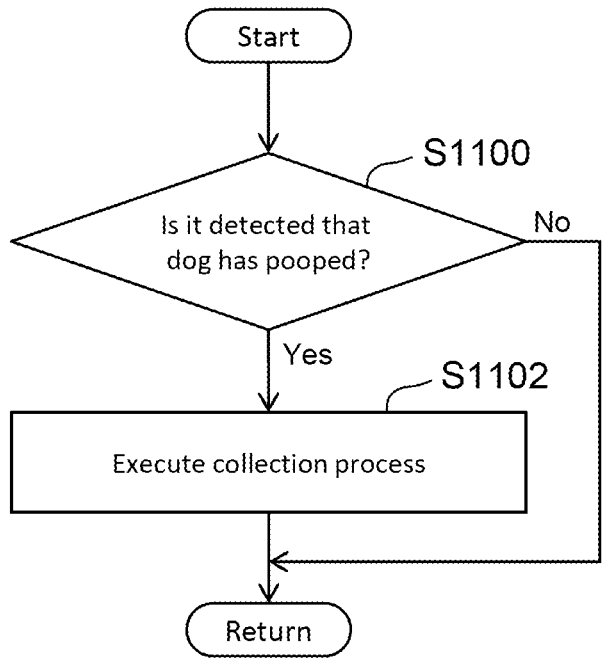
FIG. 19 is a flowchart showing an example of a collection process according to the seventh embodiment.

FIG. 19 is a flowchart showing an example of the collection process according to the seventh embodiment. The processing of this flowchart is also repeatedly executed during the execution of the walk guidance mode such as the basic walk mode.

In FIG. 19, first, the processor 64a determines in step S1100 whether or not the dog 1 has pooped. This determination can also be performed based on, for example, an image photographed by the cameras 56, similarly to the determination of step S804 described above.

When the determination result of step S1100 is negative, the processor 64a ends the current processing cycle. When, on the other hand, it is detected that the dog 1 has pooped, the process proceeds to step S1102.

In step S1102, the processor 64a executes the collection process to control the collection device 114 so as to collect the poop that the dog 1 has done. Specifically, the collection process includes a process of automatically driving the vehicle 100 toward a position where the collection arm 116 reaches the poop by using, for example, the camera 56, depending on the position of the poop with respect to the collection arm 116. Then, in the collection process, the processor 64a controls the position of the hand 116g so as to match the position of the poop by using, for example, the camera 56, then controls the hand 116g so as to pick up the poop, and then controls the collection arm 116 such that the picked up poop is stored in the collection bag 118. As a result, the poop can be collected.

7-4. Notification Process

The water discharge process described above may be executed with the following notification process. The notification process is executed when it is time to start automatic traveling toward the meeting place with the owner 4 of the dog 1 to pick up the dog 1 (in other words, it is the time to leave the vehicle 100 to provide the walk agency service). In the notification process, when the quantity of water in the tank 104 is less than a threshold value TH7, the mobile terminal 3 of the owner 4 is notified that the quantity of water is small.

Figure 20:
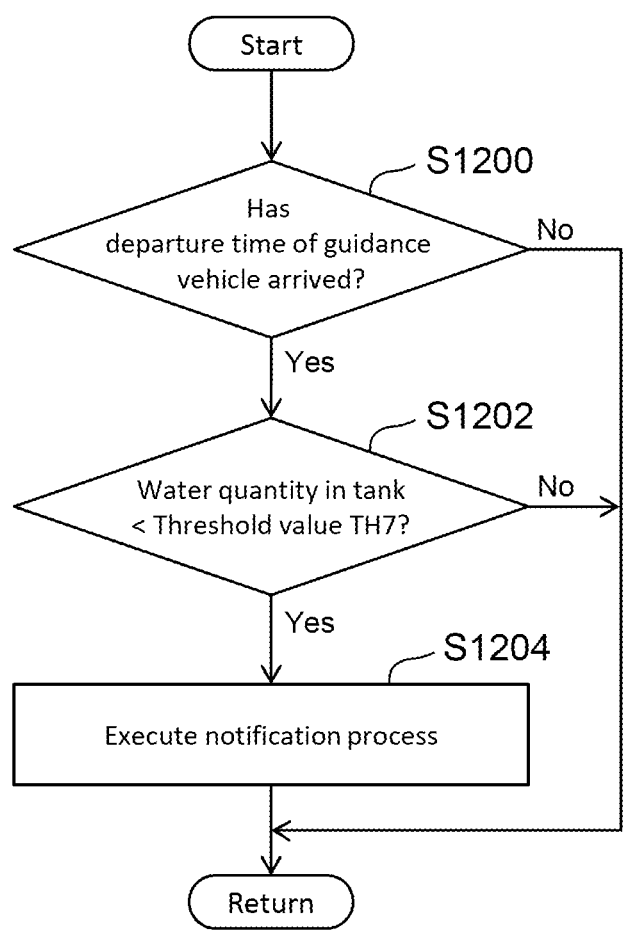
FIG. 20 is a flowchart showing an example of a notification process according to the seventh embodiment.

FIG. 20 is a flowchart showing an example of the notification process according to the seventh embodiment. The processing of this flowchart is repeatedly executed during the period when the vehicle 100 is not performing tasks such as the walk agency service.

In FIG. 20, first, the processor 64a determines in step S1200 whether or not the departure time of the vehicle 100 for providing the walk agency service to the owner 4 has arrived. This departure time is set by the management server 72 based on, for example, the scheduled vehicle dispatch time included in the vehicle dispatch reservation from the owner 4 (i.e., estimated time of arrival at the meeting place with the owner 4). Alternatively, the departure time may be calculated based on the scheduled vehicle dispatch time by using the learning result of the time required to arrive at the meeting place (for example,) with the owner 4 (for example, the home of the owner 4) when the walk agency service is provided in the past. Moreover, the departure time may be a time stored in advance in the storage device 64b.

When the determination result of step S1200 is negative, the processor 64a ends the current processing cycle. When, on the other hand, the departure time has arrived in step S1200, the process proceeds to step S1202.

In step S1202, the processor 64a determines whether or not the quantity of water in the tank 104 detected by the water quantity sensor 112 is less than a predetermined threshold value TH7. As a result, when this determination result is negative (that is, when the quantity of water is sufficient), the processor 64a ends the current processing cycle. When, on the other hand the determination result is positive (i.e., when the quantity of water is insufficient), the process proceeds to step S1204.

In step S1204, the processor 64a executes the notification process described above. That is, the processor 64a uses the communication device 60 to notify the mobile terminal 3 of the owner 4 that the quantity of water is small.

7-5. Effect

According to the seventh embodiment described above, after the dog 1 urinates during the execution of the walk guidance mode, the guidance vehicle 100 automatically waters the urine using the water discharger 102. Also, after the dog 1 has a poop, the guidance vehicle 100 automatically collects the poop using the collection device 114. Therefore, it is possible to realize the guidance vehicle 100 which can take a guided walk of the dog 1 while considering the beautification of the city or town.

Moreover, according to the notification process of the seventh embodiment, before the guidance vehicle 100 arrives at the owner 4, the owner 4 can prepare water for replenishment.

7-6. Other Configuration Examples of Guidance Vehicle

Instead of the example of the guidance vehicle 100 described above, the guidance vehicle may be equipped with only one of the water discharger and the collection device.

What is claimed is:

1. A guidance vehicle that guides a dog for a walk, comprising:
    a leash attachment configured to attach a leash that connects the dog;
    a distance sensor configured to detect a dog-to-vehicle distance being a distance between the dog and the guidance vehicle;
    a top plate having a riding surface configured for the dog to ride on;
    a dog paw position sensor including one or more dog paw position detectors associated with one or more traveling directions of the guidance vehicle, and attached to a dog riding section of the riding surface; and
    an electronic control unit configured to execute a travel control of the guidance vehicle, wherein
    the electronic control unit includes, as one of a plurality of modes of the travel control, a walk guidance mode that causes the guidance vehicle to automatically travel along a walk route while guiding the dog to walk,
    the walk guidance mode executed by the electronic control unit includes a basic walk mode that controls the dog-to-vehicle distance so as to maintain a constant distance when the dog is moving along the walk route, and
    the electronic control unit includes a dog operation mode that controls travel of the guidance vehicle based on an input to the dog paw position sensor as one of the modes of the travel control.

2. The guidance vehicle according to claim 1, wherein
    the riding surface is configured for an owner of the dog to ride on,
    the guidance vehicle further comprises an operation device configured for the owner to operate the guidance vehicle, and
    when an input to the dog paw position sensor and an input to the operation device are simultaneously present during execution of the dog operation mode, the electronic control unit is configured to control the travel of the guidance vehicle based on the input to the operation device.

* * * * *